US007877798B2

(12) United States Patent
Saunders et al.

(10) Patent No.: US 7,877,798 B2
(45) Date of Patent: Jan. 25, 2011

(54) SYSTEM AND METHOD FOR CONNECTING GAMING DEVICES TO A NETWORK FOR REMOTE PLAY

(75) Inventors: Michael W Saunders, Henderson, NV (US); Rolf E Carlson, Albuquerque, NM (US); William D Miller, Las Vegas, NV (US)

(73) Assignee: Legal iGaming, Inc., Las Vegas, NV (US)

( * ) Notice: Subject to any disclaimer, the term of this patent is extended or adjusted under 35 U.S.C. 154(b) by 14 days.

(21) Appl. No.: 12/331,331

(22) Filed: Dec. 9, 2008

(65) Prior Publication Data

US 2009/0088258 A1 Apr. 2, 2009

Related U.S. Application Data

(60) Division of application No. 10/913,301, filed on Aug. 5, 2004, now Pat. No. 7,690,043, which is a continuation of application No. 10/682,095, filed on Oct. 8, 2003, now abandoned, application No. 12/331,331, which is a continuation-in-part of application No. 11/302,564, filed on Dec. 13, 2005, which is a continuation of application No. 09/143,907, filed on Aug. 31, 1998, now Pat. No. 6,986,055, which is a division of application No. 08/959,575, filed on Oct. 28, 1997, now Pat. No. 6,272,223, which is a division of application No. 08/358,242, filed on Dec. 19, 1994, now Pat. No. 5,707,286, said application No. 10/913,301 is a continuation-in-part of application No. 09/698,507, filed on Oct. 26, 2000, now Pat. No. 7,260,834.

(60) Provisional application No. 60/417,913, filed on Oct. 9, 2002, provisional application No. 60/161,591, filed on Oct. 26, 1999.

(51) Int. Cl.
*G06F 12/14* (2006.01)
(52) U.S. Cl. ....................................................... 726/20
(58) Field of Classification Search ...................... None
See application file for complete search history.

(56) References Cited

U.S. PATENT DOCUMENTS

| 3,309,509 A | 3/1967 | Vasseur |
| 4,093,223 A | 6/1978 | Wilke et al. |
| 4,179,663 A | 12/1979 | Vasseur |
| 4,240,635 A | 12/1980 | Brown |
| 4,339,798 A | 7/1982 | Hedges et al. |
| 4,405,829 A | 9/1983 | Rivest et al. |
| 4,441,714 A | 4/1984 | Goott |

(Continued)

FOREIGN PATENT DOCUMENTS

EP 0 715 245 6/1996

(Continued)

OTHER PUBLICATIONS

Office Action dated Jun. 18, 2010 in U.S. Appl. No. 12/102,832.

(Continued)

*Primary Examiner*—Brandon S Hoffman
(74) *Attorney, Agent, or Firm*—Knobbe Martens Olson & Bear LLP

(57) ABSTRACT

A system and method for connecting remote player devices to regulated host gaming devices in a network to provide remote game play. A host gaming device is configured to provide game information to a plurality of remote player devices to allow remote play of the host game device. Whether each remote player device is permitted to receive gaming data is based upon, at least in part, the geographic location of the remote player device.

24 Claims, 20 Drawing Sheets

U.S. PATENT DOCUMENTS

| | | | |
|---|---|---|---|
| 4,467,424 A | 8/1984 | Hedges et al. |
| 4,510,495 A | 4/1985 | Sigrimis et al. |
| 4,527,798 A | 7/1985 | Siekierski et al. |
| 4,582,324 A | 4/1986 | Koza et al. |
| 4,636,951 A | 1/1987 | Harlick |
| 4,652,998 A | 3/1987 | Koza et al. |
| 4,786,056 A | 11/1988 | Dunnigan |
| 4,819,818 A | 4/1989 | Simkus et al. |
| 4,856,787 A | 8/1989 | Itkis |
| 4,920,432 A | 4/1990 | Eggers et al. |
| 4,926,256 A | 5/1990 | Nanba |
| 4,943,062 A | 7/1990 | Gillette |
| 4,977,596 A | 12/1990 | Maestas et al. |
| 4,998,199 A | 3/1991 | Tashiro et al. |
| 5,013,038 A | 5/1991 | Luxenberg et al. |
| 5,083,272 A | 1/1992 | Walker et al. |
| 5,112,050 A | 5/1992 | Koza et al. |
| 5,128,752 A | 7/1992 | Von Kohorn |
| 5,165,091 A | 11/1992 | Lape et al. |
| 5,228,077 A | 7/1993 | Darbee |
| 5,251,165 A | 10/1993 | James, III |
| 5,309,509 A | 5/1994 | Cocklin et al. |
| 5,326,104 A | 7/1994 | Pease et al. |
| 5,330,185 A | 7/1994 | Wells |
| 5,356,144 A | 10/1994 | Fitzpatrick et al. |
| 5,361,323 A | 11/1994 | Murata et al. |
| 5,396,440 A | 3/1995 | Coburn |
| 5,398,932 A | 3/1995 | Eberhardt et al. |
| 5,417,424 A | 5/1995 | Snowden et al. |
| 5,420,928 A | 5/1995 | Aiello et al. |
| 5,429,361 A | 7/1995 | Raven et al. |
| 5,434,560 A | 7/1995 | King et al. |
| 5,457,306 A | 10/1995 | Lucero |
| 5,481,542 A | 1/1996 | Logston et al. |
| 5,488,411 A | 1/1996 | Lewis |
| 5,511,784 A | 4/1996 | Furry et al. |
| 5,515,307 A | 5/1996 | Aiello et al. |
| 5,526,035 A | 6/1996 | Lappington et al. |
| 5,528,526 A | 6/1996 | Klug et al. |
| 5,575,717 A | 11/1996 | Houriet et al. |
| 5,634,849 A | 6/1997 | Abecassis |
| 5,643,086 A | 7/1997 | Alcorn et al. |
| 5,659,569 A | 8/1997 | Padovani et al. |
| 5,668,945 A | 9/1997 | Ohba et al. |
| 5,668,950 A | 9/1997 | Kikuchi et al. |
| 5,689,561 A | 11/1997 | Pace |
| 5,695,400 A | 12/1997 | Fennell et al. |
| 5,707,286 A | 1/1998 | Carlson |
| 5,762,552 A | 6/1998 | Vuong et al. |
| 5,770,533 A | 6/1998 | Franchi |
| 5,790,677 A | 8/1998 | Fox et al. |
| 5,830,069 A | 11/1998 | Soltesz et al. |
| 5,857,025 A | 1/1999 | Anderson et al. |
| 5,860,862 A | 1/1999 | Junkin |
| 5,867,577 A | 2/1999 | Patarin |
| 5,954,582 A | 9/1999 | Zach |
| 5,964,660 A | 10/1999 | James et al. |
| 5,971,849 A | 10/1999 | Falciglia |
| 6,001,016 A | 12/1999 | Walker et al. |
| 6,002,772 A | 12/1999 | Saito |
| 6,012,983 A | 1/2000 | Walker et al. |
| 6,071,190 A | 6/2000 | Weiss et al. |
| 6,099,408 A | 8/2000 | Schneier et al. |
| 6,117,010 A | 9/2000 | Canterbury et al. |
| 6,142,872 A | 11/2000 | Walker et al. |
| 6,149,522 A | 11/2000 | Alcorn et al. |
| 6,183,362 B1 | 2/2001 | Boushy |
| 6,210,274 B1 | 4/2001 | Carlson |
| 6,233,577 B1 | 5/2001 | Ramasubramani |
| 6,234,898 B1 | 5/2001 | Belamant et al. |
| 6,264,560 B1 | 7/2001 | Goldberg et al. |
| 6,272,223 B1 | 8/2001 | Carlson |
| RE37,414 E | 10/2001 | Harlick |
| 6,370,249 B1 | 4/2002 | Van Oorschot |
| 6,428,413 B1 | 8/2002 | Carlson |
| 6,431,983 B2 | 8/2002 | Acres |
| 6,450,885 B2 | 9/2002 | Schneier et al. |
| 6,508,709 B1 | 1/2003 | Karmarkar |
| 6,527,638 B1 | 3/2003 | Walker et al. |
| 6,607,439 B2 | 8/2003 | Schneier et al. |
| 6,676,522 B2 | 1/2004 | Rowe et al. |
| 6,682,421 B1 | 1/2004 | Rowe et al. |
| 6,711,264 B1 | 3/2004 | Matsumoto et al. |
| 6,757,825 B1 | 6/2004 | MacKenzie et al. |
| 6,805,634 B1 | 10/2004 | Wells et al. |
| 6,816,966 B1 | 11/2004 | Gupta et al. |
| 6,846,238 B2 | 1/2005 | Wells |
| 6,986,055 B2 | 1/2006 | Carlson |
| 7,168,089 B2 | 1/2007 | Nguyen et al. |
| 7,260,834 B1 | 8/2007 | Carlson |
| 7,690,043 B2 | 3/2010 | Saunders et al. |
| 2002/0032049 A1 | 3/2002 | Walker et al. |
| 2002/0071557 A1 | 6/2002 | Nguyen et al. |
| 2002/0094858 A1 | 7/2002 | Yacenda |
| 2002/0094871 A1 | 7/2002 | Luciano et al. |
| 2002/0098888 A1 | 7/2002 | Rowe et al. |
| 2002/0103027 A1 | 8/2002 | Rowe et al. |
| 2002/0103028 A1 | 8/2002 | Carter et al. |
| 2002/0115487 A1 | 8/2002 | Wells |
| 2002/0116615 A1 | 8/2002 | Nguyen et al. |
| 2002/0123966 A1 | 9/2002 | Chu et al. |
| 2002/0128055 A1 | 9/2002 | Adams et al. |
| 2002/0129249 A1 | 9/2002 | Maillard et al. |
| 2002/0132663 A1 | 9/2002 | Cumbers |
| 2002/0132666 A1 | 9/2002 | Lind et al. |
| 2002/0137217 A1 | 9/2002 | Rowe |
| 2002/0138594 A1 | 9/2002 | Rowe |
| 2002/0138600 A1 | 9/2002 | Singhai |
| 2002/0142842 A1 | 10/2002 | Easley et al. |
| 2002/0142844 A1 | 10/2002 | Kerr |
| 2002/0147047 A1 | 10/2002 | Letovsky et al. |
| 2002/0151363 A1 | 10/2002 | Letovsky et al. |
| 2002/0155887 A1 | 10/2002 | Criss-Puszkiewicz et al. |
| 2002/0165023 A1 | 11/2002 | Brosnan et al. |
| 2003/0054880 A1 | 3/2003 | Lam et al. |
| 2003/0078103 A1 | 4/2003 | LeMay et al. |
| 2003/0100372 A1 | 5/2003 | Gatto et al. |
| 2003/0224858 A1* | 12/2003 | Yoseloff et al. ............... 463/43 |
| 2003/0233542 A1 | 12/2003 | Benaloh |
| 2004/0002385 A1 | 1/2004 | Nguyen |
| 2004/0002386 A1 | 1/2004 | Wolfe et al. |
| 2004/0111369 A1* | 6/2004 | Lane et al. .................... 705/40 |
| 2004/0151366 A1 | 8/2004 | Nefian et al. |
| 2004/0198494 A1 | 10/2004 | Nguyen et al. |
| 2004/0209660 A1 | 10/2004 | Carlson |
| 2006/0165235 A1 | 7/2006 | Carlson |
| 2008/0032788 A1 | 2/2008 | Carlson |
| 2008/0254878 A1 | 10/2008 | Saunders et al. |
| 2008/0254891 A1 | 10/2008 | Saunders et al. |
| 2008/0254892 A1 | 10/2008 | Saunders et al. |
| 2008/0254897 A1 | 10/2008 | Saunders et al. |
| 2008/0261679 A1 | 10/2008 | Carlson |
| 2008/0287181 A1 | 11/2008 | Carlson |
| 2009/0088240 A1 | 4/2009 | Saunders et al. |
| 2009/0088257 A1 | 4/2009 | Saunders et al. |
| 2009/0093311 A1 | 4/2009 | Saunders et al. |
| 2009/0093312 A1 | 4/2009 | Carlson |

FOREIGN PATENT DOCUMENTS

| | | |
|---|---|---|
| EP | 1 061 430 | 12/2000 |
| EP | 1 074 955 | 2/2001 |
| WO | WO 02/05229 | 1/2002 |

WO WO 03/085613 10/2003

OTHER PUBLICATIONS

Examiner's First Report on Australian App. No. 2003282576, dated Nov. 20, 2009.
Office Action dated Jul. 6, 2010 in U.S. Appl. No. 11/302,564.
Office Action dated Jun. 4, 2010 in U.S. Appl. No. 11/841,557.
Declaration of Interference filed Mar. 5, 2010 in Patent Interference No. 105,747 (RES), *Legal iGaming* v. *IGT*.
Errata Sheet dated Mar. 18, 2010 in Patent Interference No. 105,747 (RES), *Legal iGaming* v. *IGT*.
Order Authorizing Motions dated May 3, 2010 in Patent Interference No. 105,747 (RES), *Legal iGaming* v. *IGT*.
Legal iGaming List of Proposed Motions dated Apr. 28, 2010 in Patent Interference No. 105,747 (RES), *Legal iGaming* v. *IGT*.
IGT Motion List dated Apr. 28, 2010 in Patent Interference No. 105,747 (RES), *Legal iGaming* v. *IGT*.
Legal iGaming List of Exhibits Filed and Served on Jul. 16, 2010 in Patent Interference No. 105,747 (RES), *Legal iGaming* v. *IGT*.
IGT Notice of Filing of Exhibits 1001-1008 dated Jun. 4, 2010 in Patent Interference No. 105,747 (RES), *Legal iGaming* v. *IGT*.
Legal iGaming Opposition 1 dated Jul. 16, 2010 in Patent Interference No. 105,747 (RES), *Legal iGaming* v. *IGT*.
IGT Substantive Motion 1 (for Judgment Based on No Interference-in-Fact), dated Jun. 4, 2010 in Patent Interference No. 105,747 (RES), *Legal iGaming* v. *IGT*.
Declaration of Chris Lundy (in support of IGT Substantive Motion 1), dated Jun. 4, 2010 in Patent Interference No. 105,747 (RES), *Legal iGaming* v. *IGT*.
Office Action dated Feb. 8, 2006 in U.S. Appl. No. 10/116,424.
First Declaration of Charles R. Berg, dated Jul. 14, 2010 in Patent Interference No. 105,747 (RES), *Legal iGaming* v. *IGT*.
Transcript of videotaped deposition of Christopher Lundy, dated Jun. 30, 2010 in Patent Interference No. 105,747 (RES), *Legal iGaming* v. *IGT*.
International Search Report for Application No. PCT/US03/09669 dated Jul. 31, 2003.
Office Action dated Oct. 20, 2008 in U.S. Appl. No. 10/913,301.
Office Action dated Mar. 27, 2009 in U.S. Appl. No. 10/913,301.
Office Action dated Jul. 22, 2009 in U.S. Appl. No. 12/102,832.
Office Action dated Feb. 8, 2010 in U.S. Appl. No. 12/102,832.
International Search Report for Application No. PCT/US03/032153 dated Oct. 15, 2004.
Office Action dated Jan. 7, 2007 in U.S. Appl. No. 08/358,242.
Office Action dated Aug. 14, 2006 in U.S. Appl. No. 10/658,836.
Office Action dated Feb. 20, 2007 in U.S. Appl. No. 10/658,836.
Office Action dated Oct. 31, 2007 in U.S. Appl. No. 10/658,836.
Office Action dated Jul. 8, 1999 in U.S. Appl. No. 08/959,575.
Office Action dated Oct. 27, 1999 in U.S. Appl. No. 08/959,575.
Office Action dated May 23, 2000, in U.S. Appl. No. 08/959,575.
Office Action dated Dec. 20, 2000, in U.S. Appl. No. 08/959,575.
Office Action dated Jun. 19, 2001 in U.S. Appl. No. 09/143,907.
Office Action dated May 1, 2002 in U.S. Appl. No. 09/143,907.
Office Action dated Dec. 1, 2004, in U.S. Appl. No. 09/143,907.
Office Action dated Jan. 11, 2005 in U.S. Appl. No. 09/143,907.
Office Action dated Apr. 7, 2009 in U.S. Appl. No. 11/302,564.
Office Action dated Dec. 24, 2009 in U.S. Appl. No. 11/302,564.
Office Action dated Oct. 23, 2000 in U.S. Appl. No. 09/143,908.
Office Action dated Dec. 8, 2004 in U.S. Appl. No. 09/698,507.
Office Action dated Jan. 13, 2005 in U.S. Appl. No. 09/698,507.
Office Action dated Oct. 5, 2005 in U.S. Appl. No. 09/698,507.
Office Action dated May 19, 2006 in U.S. Appl. No. 09/698,507.
Office Action dated Dec. 11, 2006 in U.S. Appl. No. 09/698,507.

* cited by examiner

SYSTEM AND METHOD FOR CONNECTING GAMING DEVICES TO A NETWORK FOR REMOTE PLAY

RELATED APPLICATIONS

This application is a divisional of U.S. application Ser. No. 10/913,301, filed on Aug. 5, 2004, which issued on Mar. 30, 2010 as U.S. Pat. No. 7,690,043, which is a continuation of U.S. application Ser. No. 10/682,095, filed on Oct. 8, 2003, now abandoned, which claims priority to U.S. Provisional Application No. 60/417,913, filed on Oct. 9, 2002, each of which is incorporated by reference in its entirety.

The present application is also a continuation-in-part of U.S. application Ser. No. 11/302,564, filed Dec. 13, 2005, which is a continuation of U.S. application Ser. No. 09/143,907, filed Aug. 31, 1998 entitled "UNIVERSAL GAMING ENGINE", which issued on Jan. 10, 2006 as U.S. Pat. No. 6,986,055, which was a divisional application of U.S. application Ser. No. 08/959,575 filed Oct. 28, 1997, which issued on Aug. 7, 2001 as U.S. Pat. No. 6,272,223, which was a divisional application of U.S. application Ser. No. 08/358,242 filed Dec. 19, 1994 which issued on Jan. 13, 1998 as U.S. Pat. No. 5,707,286. Each of U.S. Pat. No. 5,707,286 and U.S. Pat. No. 6,272,223 are incorporated by reference in their entirety.

U.S. application Ser. No. 10/913,301, filed Aug. 5, 2004, is also a continuation-in-part of U.S. application Ser. No. 09/698,507, filed Oct. 26, 2000 entitled "CRYPTOGRAPHY AND CERTIFICATE AUTHORITIES IN GAMING MACHINES" which issued on Aug. 21, 2007 as U.S. Pat. No. 7,260,834 and is based on, and claims priority to U.S. Provisional Application No. 60/161,591, filed Oct. 26, 1999. Each of the foregoing patents and applications are incorporated by reference in their entirety.

BACKGROUND OF THE INVENTION

1. Field of the Invention

The present invention generally relates to electronic devices. In particular, the invention relates to methods and systems of interactive gaming.

The present invention also relates to gaming machines, and, more particularly, to an electronic gaming engine supporting multiple games and multiple users.

2. Description of the Related Technology

Traditionally, the way for a gaming operator to increase revenue from gaming devices is to increase the number of gaming devices available for play. In order for casinos to increase the number of gaming devices available for play, casino floor space must be added to house the additional gaming devices. The floor space allocated to house additional gaming devices must meet specific criteria as defined by the gaming authority for the jurisdiction in which the gaming devices are to be located. Providing additional floor space is an expensive process for casino operators and often requires constructing new casino properties. Also, adding gaming devices typically requires payment of additional licensing fees for each additional game.

A trend in the gaming industry has been to provide Internet gaming. Internet gaming allows players to make wagers on the outcome of casino style games similar to that described above, except that the player does not have to be physically located in a casino to do so. Internet players make wagers and play casino games using a personal computer and wager on games running on computers connected to the Internet.

More broadly, interactive gaming is the conduct of gambling games through the use of electronic devices. The popularity of Internet gambling sites has indicated a strong market for remotely accessible gaming, or other interactive gaming. Regulated casino operators strongly desire to provide interactive gaming while capitalizing on existing infrastructure. Thus there is a need for improved electronic devices that support regulated remote gaming.

Casino gaming has grown rapidly in the United States. Casino gaming is experiencing similar growth throughout the world. An important segment of this developing industry is electronic games. An electronic implementation of a game requires a method for interpreting human actions as they occur within the constraints of the rules as well as the ability to respond with chance events.

Microprocessors allow games that formerly relied on analog devices for generating chance events, such as dice, to be simulated digitally. Simulating a die roll with a computer would seem to be a contradiction because the microprocessor is the embodiment of logic and determinism. With care, however, it is possible to create deterministic algorithms that produce unpredictable, statistically random numbers.

Contemporary games consist of a framework of rules that define the options for how a user or random event generator may change the game state. Play begins with an initial state. Subsequent play consists of user initiated events that trigger the execution of one or more rules. A rule may proceed deterministically or non-deterministically.

Typical games consist of deterministic and non-deterministic rules. A game progresses by the interaction of these rules. There are two sources for non-determinism" player decisions and chance events. In the game of Poker, for example, deciding to replace three instead of two cards in a hand is a player decision that is limited, but not pre-determined, by rules. The rules limit the range of options the player has, but within that set of options the player is free to choose. An example of a chance event is the random set of cards received by the poker player. Shuffled cards do not produce a predictable hand.

Other examples that illustrate determinism and non-determinism in gaming are popular casino pastimes such as Blackjack, Keno, and Slot machines. The first Blackjack hand a player receives is two cards from a shuffled deck. The number of cards dealt is two, but the cards could be any from the deck. Keno is essentially a lottery. In Keno, a player attempts to guess twenty balls chosen from a basket of eighty balls. The rules dictate that to participate, a player must fill out a Keno ticket indicating the balls he believes will be chosen in the next round the selection of balls, however, is a purely random event. Slot machines require the player to pull a handle for each round. Slot wheels stop at random positions.

The non-deterministic problem in most parlor games is random sampling without replacement: given a set of n elements, randomly choose m of them without replacement where m is less than or equal to n. Although sampling without replacement covers most popular games, it would be easy to conceive of games that required replacement. For example, consider a variant of Keno that replaces each chosen ball before selecting the next ball. Until now, no device is available that services the needs of multiple games by providing algorithms for sampling with and without replacement as well as others such as random permutation generation, sorting, and searching.

A casino player must know the likelihood of winning a jackpot is commensurate with the stated theoretical probabilities of the game. Moreover, the casino would like to payout as little as possible while maximizing the number of their game participants. Because each game sponsored by a casino has a built-in theoretical edge for the house, over time and with repeated play, the house will make money. In other words, the casino does not need to cheat the customer because it has a built-in edge. The customer, who is at a disadvantage in the long run, will want to know the game is fair in order to manage risk. In is a theoretical fact that bold wagering in Roulette increases a players odds of winning. A player who cannot know the odds of winning cannot formulate a strategy.

Provided that the deterministic rules of a game are implemented correctly, it is essential that the chance events of a game are indeed random. an important subproblem for generating random events is uniform random number generation. If the underlying uniform random number generator does not generate statistically independent and uniform pseudo-random numbers, then either the house or customer will be at a disadvantage. A poorly designed system might favor the house initially and over time turn to favor the player. Certainly the house would not want this situation because it makes revenue projection impossible. Any regulatory body would like to ensure that neither the house nor customer have an advantage beyond the stated theoretical probabilities of the game. In the context of fairly implemented rules, the only way for the house to increase its revenue is to increase the number of players participating in their games.

Typically, an engineer creating an electronic game generates a flow chart representing the rules and uses a random number generator in conjunction with combinatorial algorithms for generating chance events. Representing rules is one problem. Generating chance events to support those rules is another. Creating pseudo-random numbers is a subtle problem that requires mathematical skills distinct from other problems of gaming. In other words, a skilled game programmer may be unable to solve the problems of developing a proper random number generator. Even if given a quality random number generator, problems can occur in hardware implementations that render the generator predictable. One example is using the same seed, or initial state, for the generator at regular intervals and repeatedly generating a limited batch of numbers. Without attending to the theoretical aspects of a uniform random number generator, it is not possible to implement the rules of a game perfectly. The result is a game unfair to the house, players, or both. Hence, there is a need for a gaming system, apparatus, and method that separate the problem of implementing game rules from that of random event generation.

The need for such a device is also evident at the regulatory level. Gaming is a heavily regulated industry. States, tribes, and the federal government have gaming regulatory agencies at various levels to ensure fairness of the games. The gaming regulatory authority certifies that a particular implementations of a game reflects the underlying probabilities. Because electronic games are implemented in often difficult to understand software, the problem of verifying fairness of a game is challenging. Further, there is little uniformity in the implementation of fundamental components of various games. To determine fairness, the gaming authority subjects each game to a battery of tests. No set of statistical tests performed on a limited portion of the random number generator period can ensure that the generator will continue to perform fairly in the field. The process of testing is both expensive and of limited accuracy. Hence, a regulatory need exists for a uniform, standardized method of implementing games that reduce the need and extent of individual game testing while increasing he reliability of detecting and certifying game fairness.

The Universal Gaming Engine (UGE) in accordance with the present invention is a gaming apparatus providing a consistent game development platform satisfying the needs of the gaming authority, house, player, and game developer. The UGE separates the problems of developing game rules from the difficulty, of producing chance events to support those rules. Functions that are common to a number of games are included in the gaming engine so that they need not be implemented separately for each game. By including basic functions shared by a number of games, hardware costs are greatly reduced as new games can be implemented merely by providing a new set of rules in the rules library and the basic hardware operating the game remains unchanged.

SUMMARY OF THE INVENTION

The system of the present invention has several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Invention" one will understand how the features of this invention provide advantages which include providing remote gaming in regulated environment.

A gaming system and method of using the same to allow a host gaming device to be played from remote player devices to allow casino operators to obtain maximum advantage from their gaming licenses.

More particularly, in one embodiment gaming system may comprise a data network, a host gaming device connected to the data network, the gaming device configured to execute at least one game and a plurality of remote player devices connected to the data network. Each of the remote player devices is configured to receive game information provided by the host gaming device. Whether each remote player device is permitted to receive gaming data may be based upon, at least in part, the geographic location of the remote player device.

The host gaming device may be configured to allow no more than a predetermined number of remote player devices to concurrently receive game information provided by the host gaming device during the gaming session. This predetermined number may be determined by a gaming agency.

In another embodiment of a gaming system, at least one of the plurality of remote player devices may be permitted to receive game data based upon, at least in part, the geographic location of the remote player device, an age of a user of the remote player device.

A gaming system according to the invention may also include a central gaming controller configured to record gaming transactions on the host gaming device and on each remote gaming device.

The data network may be, in part, the Internet, and be comprised of one or more logical segment, which may include closed-loop networks. The host gaming device may be configured to identify the geographic location of a remote player device based, at least in part, on a logical segment corresponding to the remote player device. A mobile communications network, or a GPS device may also allow identification of the geographic location of the remote player device.

The host gaming device may be in a location approved by a gaming agency and include at least one game control configured to provide local use. This game control may be disabled when the host gaming device is providing game information to a remote player device. A host gaming device may also be configured to save an encrypted game state allowing a game to be resumed following a device or network failure.

A remote player device may be coupled to a credential device configured to receive information relating to a user of the remote player device. The information relating to a user may include the age of the user, or a password that is input by the user. The credential device is a smart card reader, a biometric device such as a fingerprint reader, or any type of input device. The credentials may be verified against information, such as age, password, or fingerprint in a database configured to provide information associated with each of a plurality of users of the gaming system.

In another embodiment, a gaming system may be comprised of a means for executing at least one game, the game providing game information during its execution, a local access means provides local access to the game information for a user in a location approved by a gaming agency, player means for receiving game information, presenting the game information to a user and providing at least one game control, a means for providing the game information over a data network to a predetermined number of receiving means, means for determining the location of the receiving means, and means for disabling the local access means. Other similar embodiments may also be comprised of means for creating an auditable record of gaming transactions on the playing means and on the gaming means.

Another embodiment of a gaming system, in addition to the features of the embodiments discussed above, may also include customized promotional messages to players of gaming devices.

On a remote player device, an embodiment of a method of remotely accessing a host gaming device may include: establishing access to the host gaming device through a data network, receiving gaming related information from the host gaming device through the data network, presenting the gaming related information to a player, receiving at least one control signal from the player, sending the control signal to the host gaming device through the data network, and disabling local use of the host gaming device. In one embodiment, the method may also include recording each gaming transaction occurring on the remote player device. Another embodiment of the method may include providing a geographic location of the remote player device. In another embodiment of the method, the age of the user of the remote player device is also provided.

On a host gaming device, an embodiment of a method of providing remote access, including: verifying the geographic location of a remote player device, establishing a gaming session on a host gaming device from a remote player device through a data network, receiving at least one control signal from the remote player device through the data network, and sending gaming related information from the gaming device through the data network. One embodiment of a method may also include recording each gaming transaction occurring on the host gaming device, In order to provide tolerance for failures of system components, a method of resuming an interrupted gaming session on a gaming device is provided. One embodiment of a method may include generating a gaming state of the gaming session on the first gaming device, encrypting the gaming state, transporting the encrypted gaming state from the gaming device. The method may also include the converse: transporting the encrypted gaming state from the first gaming device to a second gaming device, decrypting the gaming state on the second gaming device; and loading the game state into a second gaming device to resume the gaming session.

An embodiment of a gaming system which provides for resuming interrupted gaming sessions across a data network. The system may include a first host gaming device connected to the data network, the gaming device configured to execute at least one game, generate a gaming state based on execution of at least one game, encrypt the gaming state, and send the encrypted gaming state over the data network. A second host gaming device may be connected to the data network, the second gaming device configured to receive the encrypted gaming state over the data network, decrypt the gaming state, and resume executing at least one game from the gaming state. A plurality of remote player devices, configured to receive game information provided by the host gaming device, may be connected to the data network. The gaming state may include user payment or credit information, and game jackpot or payout information.

Another embodiment of a gaming system providing resumption of interrupted gaming sessions may include means for executing at least one game, means for generating a gaming state based on execution of at least one game, means for encrypting the gaming state, and means for sending the encrypted gaming state. The system may also include means for receiving the encrypted gaming state, means for decrypting the gaming state and means for resuming executing at least one game from the gaming state.

To enable gaming regulatory compliance, methods authenticating gaming system users are also provide. An embodiment of a method of authenticating a user of a host gaming device may include receiving a security certificate from the smart card, sending the security certificate from the gaming device to an authenticator device, receiving an authentication reply from the authenticator, and playing a game in response to the authentication reply.

An embodiment of the method may also include presenting the security certificate from the gaming device to a certificate authority for authentication over a data network.

An embodiment of a method of authenticating a user of a remote player device for playing a host gaming device may include receiving an indicia of identity for a user, sending the indicia of identity to an authenticator device, receiving an authentication reply from the authenticator device, and authorizing use of a host gaming device based on the indicia of identity. The indicia of identity for a user may be provided by a biometric device, a smart card, or a password provided by the user.

Another embodiment of a gaming system provides authentication of users. The system may include a data network, a host gaming device interfaced to the data network, a plurality of remote player devices interfaced to the data network, and a security device configured to provide player credentials to at least one remote player device. The each of the remote player devices may be configured to receive game information provided by the host gaming device. The host gaming device may provide game information to a predetermined number of permitted remote player devices. Whether a remote player device is permitted to receive gaming information may be based upon, at least in part, on player credentials provided by the security device.

In one embodiment, a method of remotely accessing a gaming device provides for creating records of gaming transactions on both host gaming devices and remote player devices sufficient to provide an auditable record for a gaming authority in the jurisdiction. The method may include establishing a gaming session on a gaming device for a remote player device through a data network, sending gaming related information from the gaming device through the data network, receiving at least one control signal from the remote player device through the data network, creating an auditable gaming session record representing each gaming transaction of a gaming session on the host gaming device and on the remote gaming device. In addition, the record may be sent to a third party, such as a gaming authority, through the data network.

In another embodiment of a gaming system, the gaming system includes a network comprised of a plurality of logical segments. A security policy controls the flow of data between logical segments. A host gaming device may be connected to the data network, the gaming device configured to execute at least one game. A plurality of remote player devices may be connected to the data network. The plurality of remote player devices are each configured to receive game information provided by the host gaming device, and to control a gaming session established on the gaming device, subject to the security policy. The security policy may be based, at least in part, on the geographic location of a logical segment.

One embodiment of the gaming system may include a promotional message server to deliver customized promotional messages to users of the gaming system. In this embodiment, a gaming system may include a data network, a promotional message server configured to provide customized promotional messages. Each message may be customized with information associated with a user of the gaming system. In addition, a gaming system may include a host gaming device interfaced to the data network, and a plurality of remote player devices interfaced to the data network. The plurality of remote player devices are each configured to receive game information provided by the host gaming device and to receive and present promotional messages.

In another embodiment, a gaming system may include a means for data communication, means for executing at least one game, means for providing game information over the data network to a predetermined number of receiving means, a plurality of means for receiving game information over the data communication means. Each means for receiving game information may be coupled to a means for receiving customized promotional messages. A gaming system may also include a means for presenting promotional messages in conjunction with gaming data.

A related method of displaying information on a remote player device is also provided. The method may include receiving a promotional message on a remote player device, presenting the promotional message in conjunction with gaming information for an amount of time; and removing the promotional message from the remote player device. Information in the promotional message may be used to calculate the amount of time to present the promotional message.

A remote player interface of a gaming system may have a number of embodiments. In one embodiment of a gaming system, the gaming system includes data network, a host gaming device interfaced to the data network, and at least one remote player device interfaced to the data network. The remote player device is configured to receive game information provided by the host gaming device. The remote player interface of the gaming system may include a video display device in communication with the remote player device and a remote control device in communication with the remote player device. The remote control device is configured to control operation of a game.

An embodiment of method of remotely accessing a gaming device may include establishing a gaming session on the host gaming device from a remote player device through a data network, receiving gaming related information from the host gaming device through the data network, presenting gaming related information to a player via a video display device, receiving at least one control signal generated by a remote control device for controlling the gaming session, and sending the control signal to the host gaming device through the data network.

Briefly stated, the present invention provides a system, apparatus, and method for implementing a game having a deterministic component and a non-deterministic component wherein a player uses the game through at least one player interface unit. Each player interface unit generates a player record indicating player-initiated events. A random number generator provides a series of pseudo-random numbers that are preferably statistically verified by integral verification algorithms and stored in a buffer. Preferably, the random number generator allows seed and key restoration automatically or manually upon power fault.

A rules library stores indexed rules for one or more games. An interface registry stores mapping records where the mapping records are used to associate the player-initiated events to pre-selected rules in the rules library. A control means is coupled to receive the output of the player interface unit, coupled to the interface registry, the rules library, and the random number generator. The control means processes the player record and returns an output record to the player interface unit where the output record is determined by executing the game's rules with reference to the pseudo-random numbers and predefined combinatorial algorithms for selecting sets of the pseudo-random numbers.

DETAILED DESCRIPTION OF THE PREFERRED EMBODIMENT

The following detailed description is directed to certain specific embodiments of the invention. However, the invention can be embodied in a multitude of different ways as defined and covered by the claims. In this description, reference is made to the drawings wherein like parts are designated with like numerals throughout.

In a traditional casino environment, gaming devices are generally located on a gaming floor. Gaming devices are subject to regulation by gaming regulatory agencies. Regulations may limit the locations where gaming devices may be placed and by limit users of gaming devices to those of legal age to gamble in the respective jurisdiction. Regulatory agencies for a given jurisdiction may also limit the number of licensed gaming devices provided to a licensee. Where gaming devices are physically located on a casino gaming floor, verification of whether a device is being used in its licensed location within the jurisdiction may be determined by physical inspection of the gaming floor. Further, monitoring of the gaming floor in casinos ensures that players are of legal age as set by the jurisdiction.

Figure 1:
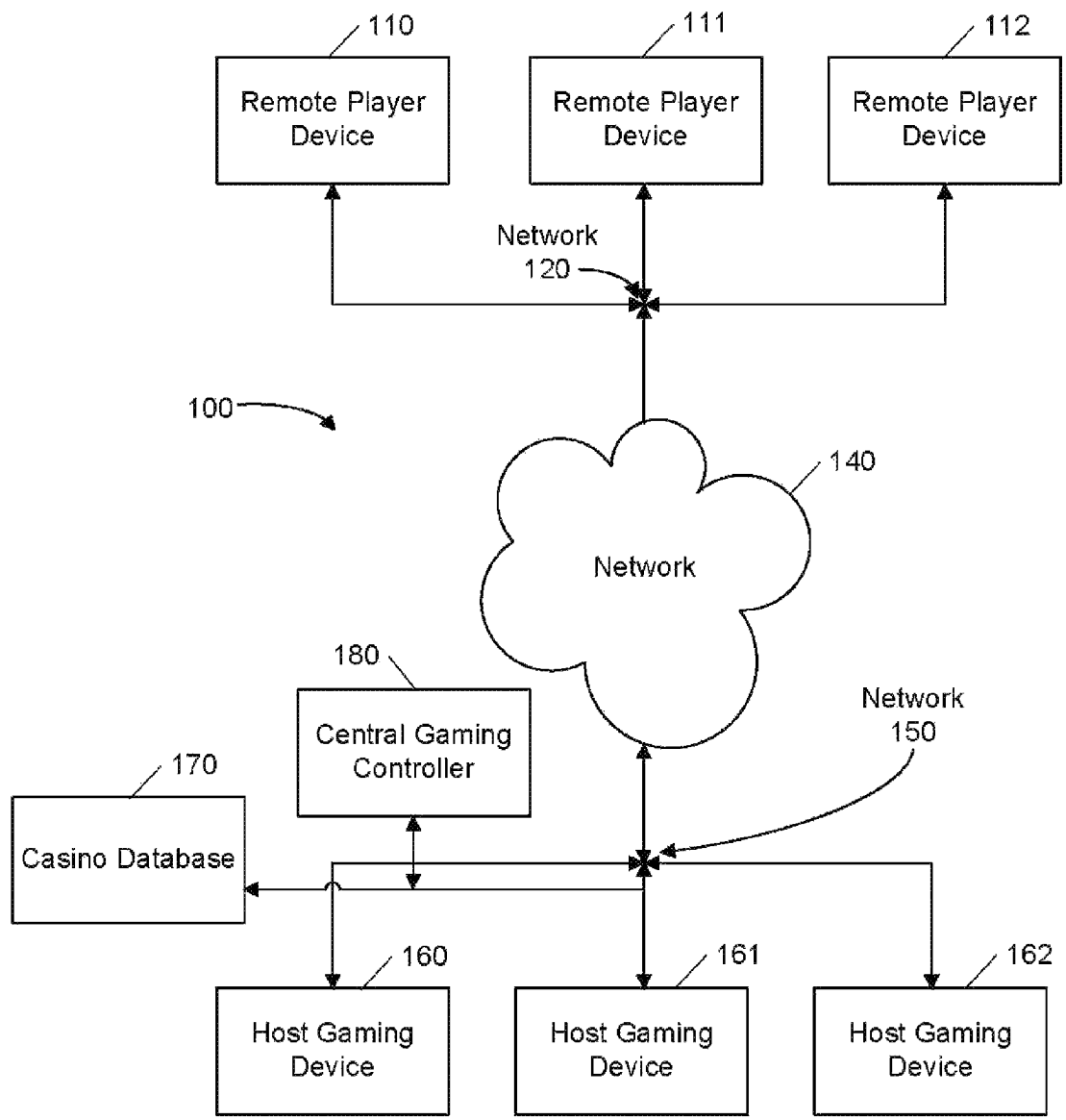
FIG. 1 depicts a simplified block diagram of a gaming system according to one embodiment of the invention.

An embodiment of a gaming system according to the present invention allows a licensed host gaming device to be used by one or more remote player devices geographically separated from the host gaming device, but still located within the jurisdiction of a gaming authority. FIG. 1 depicts a simplified block diagram of an embodiment of a gaming system 100 according to the invention. One or more host gaming devices 160, 161, 162 are licensed gaming devices. Although three host gaming devices are shown on FIG. 1, the gaming system 100 may employ any number of host gaming devices ranging from one to thousands. For convenience of discussion, set forth below is a description of certain aspects of the host gaming device 160. It is to be appreciated that the other gaming devices may contain the following or different aspects.

A host gaming device may be any device, comprised of electronic, mechanical, or a combination of electronic and mechanical components, which is used for gaming and which affects the result of a wager by determining win or loss. A host gaming device 160 is connected to a data network 150. In the embodiment depicted in FIG. 1, the data network of gaming system 100 is comprised of three logical segments. Gaming network 150 connects each host gaming device 160 and related elements such as the database 170 and central gaming controller 180. Remote network 120 connects remote player devices 110, 111, 112 to the system. Backbone network 140 provides interconnection between the gaming network 150 and the remote network 120.

The database 170 may be computer server running database software, or any other commercially available database solution. In one embodiment, as depicted, the database 170, is a casino database. In other embodiments, the database may also contain other data related, or unrelated to the casino operation.

Remote network 120 connects remote player devices 110, 111, 112 to the system. Each remote player device 110 allows a user to play a game executing on a host gaming device 160. For convenience of discussion, set forth below is a description of certain aspects of the remote player device 110. It is to be appreciated that the other remote player devices may contain the following or different aspects. Although three remote player devices are shown on FIG. 1, the gaming system 100 may employ any number of remote player devices ranging from one to thousands.

Figure 10:
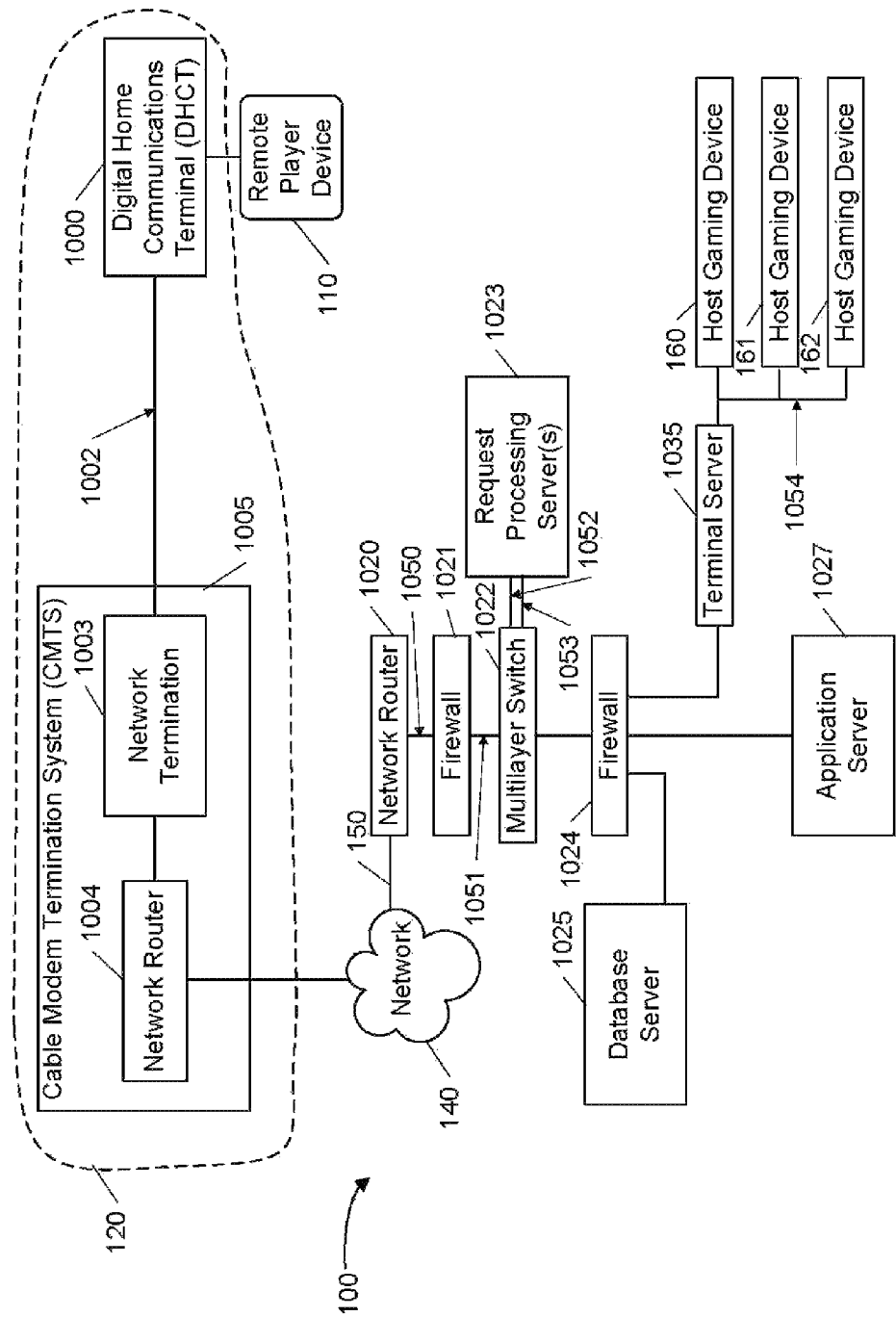
FIG. 10 is a more detailed block diagram of a gaming system as depicted in FIG. 1.

The remote network 120 may be any form of computer network, as discussed below. In one particular embodiment, the remote network 120 is part of a network provided by a cable television system. FIG. 10 depicts an embodiment of a gaming system where the remote network 120 is provided through a digital home communications terminal (DHCT) 1000, such as a set-top box.

Each host gaming device 160 may be located in any location approved by a gaming agency, such as a casino gaming floor. A host gaming device 160 provides a legally regulated random number generator. Once generation of random number has been performed, a game result is determined. Any further interaction through the game's user interface is for the benefit of a user. For example, in one embodiment of a gaming system, the host gaming device may be a slot machine. After payment is made, through a coin, token, credit device, etc, the player pulls a lever arm to execute play. In a mechanical game, for example, a slot machine, a game result may be determined by the interaction of spinning wheels. In a host gaming device 160 of an embodiment of the present invention, however, pulling the arm triggers generation of a random number which determines the game result. Thus any spinning wheels or its electronic equivalent is purely for entertainment of the user. A host gaming device 160 plays at least one game of chance, including, but not limited to, Slots, Blackjack, Poker, Keno, Bingo, or Lotteries.

Figure 2:
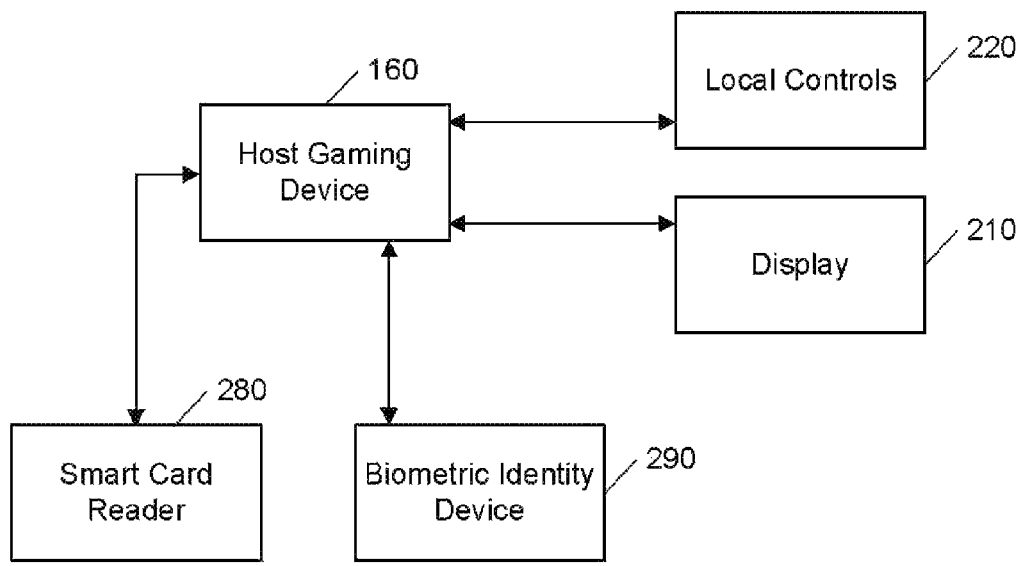
FIG. 2 depicts a simplified block diagram of system elements relating to a host gaming device of FIG. 1 according to one embodiment of the invention.

FIG. 2 depicts a more detailed block diagram of an embodiment of a gaming system 100 showing additional gaming system elements coupled to the host gaming device 160. The host gaming device 160 may include local controls 220 such as an arm. The host gaming device 160 may have a display 210 to present the results of a game to a user. Further, the gaming device 160 may have a smart card reader 280. Functions of the smart card reader 280 may include receiving payment for a game, or identifying a user for promotional or loyalty programs. A biometric identity device 290, such as a fingerprint scanner, may be used for similar functions by the gaming system.

Networks 120, 140, 150 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network includes network variations such as the public Internet, a private network within the Internet, a secure network within the Internet, a private network, a public network, a value-added network, an intranet, and the like. In embodiments of the present invention where the Internet is the backbone network 140, gaming network 150 and remote network 120 may form a virtual private network (VPN) transported over the Internet.

In preferred embodiments, the remote network 120 may be a closed-loop network, such as the cable network depicted in FIG. 10. A closed-loop network 120 may have a limited geographic scope which allows the geographic location of a remote player device 110 to be identified. For example, a given cable network may be limited to a specific hotel. Each hotel room may be provided with a remote player device 110 which may then be identified with that location. In other embodiments, the remote network 120 may be a mobile telephone network which is capable of identifying a caller's geographic location.

Figure 3:
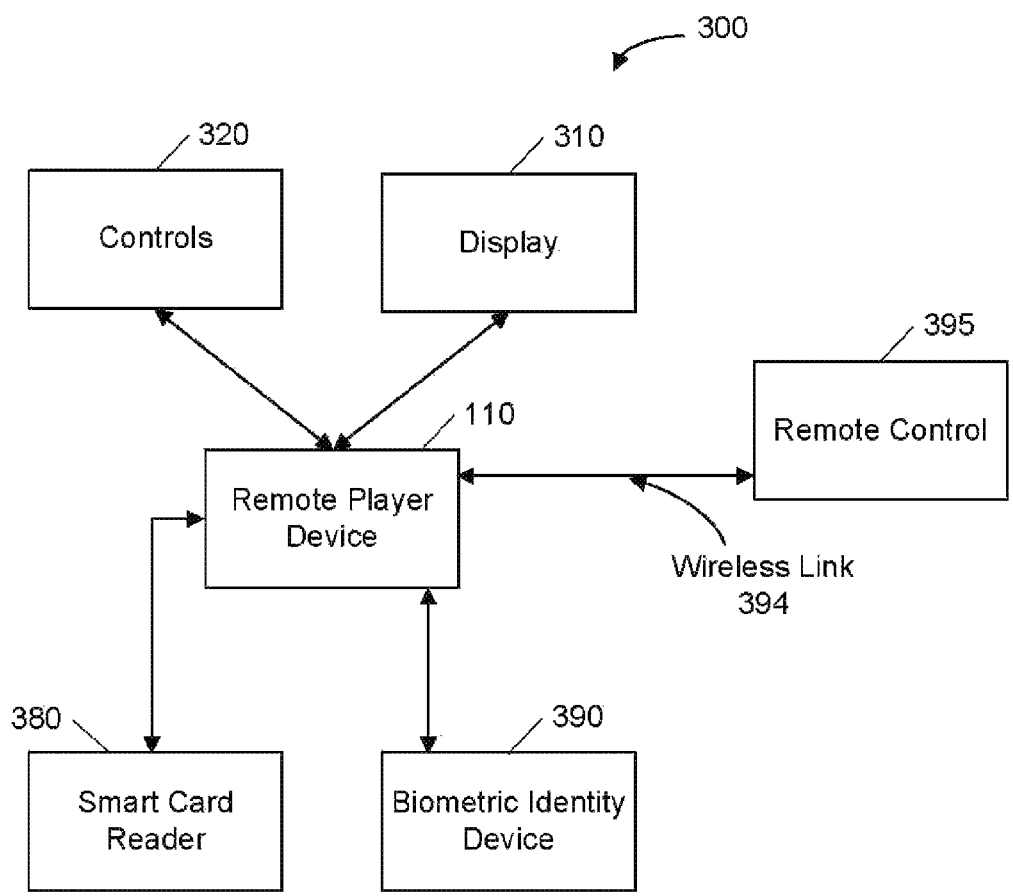
FIG. 3 depicts a simplified block diagram of system elements relating to a remote player device of FIG. 1 according to one embodiment of the invention.

As depicted in the simplified block diagram of FIG. 3, a remote player interface 300 may comprise a remote player device 110, a display 310 for presenting game information and a control 320 to provide user game control for the remote player device 160. In one embodiment, a remote player interface 110 may also comprise a remote control 395 to provide game controls. In preferred embodiments of the remote control, the connection 394 between the remote control 395 and the remote player device 160 may be any type of wireless connection, including infra-red based protocols, or a RF wireless protocol such as Bluetooth (802.15.1). The remote control 395 may also be connected to the remote player device 160 through a wired connection such as Universal Serial Bus (USB), serial, or equivalent connection. The remote control 395 may also include controls customized for gaming. A handheld computer may also comprise a remote control 395.

The display 310 may be a television, a personal computer, or a handheld computer device. A fixed or wireless telephone handset may comprise a display 310 and controls 320 of a remote player interface. In some embodiments the controls 320 may be integrated with display 310, as for instance, in a touch screen.

In one embodiment, the game information may be a random number which represents the result of the game, information related to gaming device jackpots, or player credits. In another embodiment, the gaming information may be multimedia, sound and images, including, in one embodiment, video, representing the execution of a game. In another embodiment, game information may also be software for execution on a remote player device 110 or on any element of a remote player interface 300, such as a remote control 395, which interactively presents the game through the remote player interface 300.

To enable regulatory conformance of the gaming system, gaming device users must be geographically within an approved jurisdiction and of legal age in the jurisdiction. In a regulated gaming environment, such as a gaming floor, physical control of the premises allows enforcement of this requirement. For remote player devices 110 not operated in the regulated gaming environment of a gaming floor, the age of the user of a remote player device 110 must be verified before game information is provided by a host gaming device 160. Credentials may be received from a user using a variety of security devices and compared to records, such as in a database 170 to confirm identity and thus age of the user.

To ensure compliance with regulatory requirements, a gaming system 100 may identify the geographic location of a remote player device 110. As discussed above, a network 120 may be a closed-loop network 120 whose devices are thereby identified in geographic location by the location of that network. Other embodiments may employ a GPS system on the remote player device 110 to provide the geographic location of the device 110. In other embodiments, the remote network 120 may be a mobile communications network which provides the geographic location of network clients, such as a remote player device 110.

In one embodiment, a security device may be a smart card reader 380 that is coupled to the remote player device 110. In embodiments using a smart card reader, a user inserts a smart card into the reader which provides credentials sufficient to verify the age of the user. In one such embodiment, indicia present on the smart card reader are compared to records in a casino database 170 to verify the age of the user.

In other embodiments, a remote player device 110 may be coupled to a biometric identity device 390, such as a fingerprint scanner. In one embodiment, information received from the biometric identity device 390 may be compared to records in a casino database 170 to verify the age of the user. In other embodiments a biometric identity device 390 may be retinal scanner or facial recognition device.

In some embodiments, the controls 320 may include an input device (not pictured in FIG. 3) coupled to a remote player device 110 to receive a password or PIN as a security device. The password or PIN may be compared to information, such as records in a casino database 170 to verify the identity, and thus the age, of the remote player device user. For example, the input device may be a keyboard, rollerball, pen and stylus, mouse, or voice recognition system. The input device may also be a touch screen associated with an output device. The user may respond to prompts on the display by touching the screen. The user may enter textual or graphic information through the input device. The controls 320 may be coupled to a display 310 in the form of a personal computer, a television, a television with a set-top box, a handheld computer, or a telephone, fixed or mobile, handset.

Embodiments of a remote player device 110 may be a television, a cable interactive set-top box, a remote control, a personal computer, or a mobile or fixed telephone handset. Another embodiment may comprise a handheld computer coupled to a fixed or preferably wireless network. Also, a host gaming device 160 may also be a remote player device 110.

In one embodiment, a remote gaming device 110 may be in a location approved by a gaming agency with controls 320 and display 310 which match the appearance of a stand-alone gaming device. For example, a remote gaming device 110 may be appear to be a slot machine with an arm control 320, a mechanical or electronic "slots" display 310. In other embodiments, remote gaming devices 110, regardless of location, may have controls and displays which match the appearance of a host gaming device 160. This may include control devices coupled to personal computers or set-top boxes which may be customized for one or more games.

Indicia of identity and age received from a smart card reader 380, biometric identity device 390, or user entry of a password may also be compared to records stored on the remote player device 110. For example, a remote player device 110 in a hotel room may be programmed by hotel staff to store identification information for eligible guests in the room containing the gaming device without the identification information being included in the casino database 170. In these embodiments, access to the remote player device thus may itself be an indicium of legal age to the central gaming controller 180 or host gaming device 160.

A central gaming controller 180 may manage the interaction of remote player devices and host gaming devices. The central gaming controller 180 may comprise one or more server computers or may be integrated with a host gaming device. In the embodiment depicted in FIG. 10, the application server 1027 and request processing servers 1023 comprise the central gaming controller 180.

One embodiment of a gaming system 100 comprises a single remote player on a remote player device 110 establishing a gaming session on a host gaming device 160 with no local player using the host gaming device 160. In this embodiment, the local controls 220 of a host gaming device 160 become disabled for local play during the remote gaming session. Correspondingly, a host gaming device 160 in this embodiment also becomes unavailable for remote play while a player uses the local controls 220 to use the host gaming device 160.

Another embodiment comprises a single player using the local controls 220 of a host gaming device 160 and a single remote player on remote player device 110 concurrently. Thus in this embodiment, the local game controls 220 on the host gaming device 160 are not disabled during the remote gaming session.

Another embodiment of the gaming system 100 comprises a single local player of the host gaming device 160 and multiple remote players on a plurality of remote player devices 110 having concurrent gaming sessions. A similar embodiment comprises multiple concurrent remote players and no local players on the host gaming device 160 because the local controls 220 may be disabled during the remote gaming sessions.

Another embodiment of a gaming system 100 comprises one or more remote player devices 110 which are physically located in a location approved by a gaming agency and networked to a host gaming device 160 that hosts both local and remote player sessions. Players physically located in the casino may occupy a remote player device 110 and play the games provided by the host gaming device 160. Concurrently, gaming sessions to one or more remote player devices 110 physically located outside the casino may be provided. Thus, in this embodiment, players may concurrently play using the host gaming device 160, a physically remote player device 110, or a remote player device 110 in a location approved by a gaming agency.

Another embodiment of the invention comprises one or more remote player devices 110, physically located in a location approved by a gaming agency and at least one host gaming device 160. In this embodiment, player sessions may only be established on a host gaming device 160 from a remote player device 110 if that remote player device 110 is physically located in a location approved by a gaming agency, such as a casino gaming floor. Players may also play the host gaming device 160 using local controls 220 concurrently with remote player sessions. Thus, in this embodiment, players may concurrently play using the host gaming device 160, or a remote player device 110 that is located in a location approved by a gaming agency.

In each of the above disclosed embodiments, the remote player devices 110 that may concurrently receive game information from a host gaming device 160 may be limited to a predetermined number that is determined by a regulatory gaming agency for the jurisdiction.

A remote player device 110 that is physically located in the casino in a location approved by a gaming agency, such as a casino gaming floor, may differ from a remote player device physically located outside the casino floor. In one embodiment, a remote player device 110 located in a location approved by a gaming agency resembles the appearance of a stand-alone gaming device and may thus be similar in appearance and operation to the host gaming device 160.

In one embodiment, a remote player device 110 requests game data from the host gaming device 160 by sending a request for a game to a central gaming controller 180. The central gaming controller 180 then transmits the request for a game to the host gaming device 160. The host gaming device 160 receives the request and provides game data to the central gaming controller 180 that passes to the remote player device 110. That information is then translated into a game by the remote player device 110 and displayed or performed to the player. The remote player device 110 may contain on-board hardware and software that may be required to present a game. The regulated portion of hardware and software required to execute a game, such as a random number generator, is on the host gaming device 160 and the information transmitted to the remote player device 110 each time a game is requested.

Gaming devices according to an embodiment of the invention may use mixed-protocol delivery systems for game content and game results. Game information and results comprising image and sound data may be delivered by packet based network protocols such as IP datagrams, by connection-oriented network protocols, or by a combination of both. Streaming media protocols may also be employed. During a given gaming session, these communication methods may be used interchangeably or concurrently.

In one embodiment, communication over the data networks 120, 140, or 150, may use IP datagrams to package image and sound data comprising a host gaming device interface and display, encrypts it, and delivers it to the remote player device.

Internet Protocol (IP) is a network layer protocol used by many corporations, governments, and the Internet worldwide. IP is a connectionless network layer protocol that performs addressing, routing and control functions for transmitting and receiving datagrams over a network. The network layer routes packets from source to destination. An IP datagram is a data packet comprising a header part and a data part. The header part includes a fixed-length header segment and a variable-length optional segment. The data part includes the information being transmitted over the network. As a connectionless protocol, IP does not require a predefined path associated with a logical network connection. Hence, IP does not control data path usage. If a network device or line becomes unavailable, IP provides the mechanism needed to route datagrams around the affected area.

The remote player interacts with a game through a remote player interface 300. A remote player device 110 may send commands back to the central gaming controller 180 as, in one embodiment, IP datagrams. The IP datagrams are interpreted by the central gaming controller 180 and used to proxy user interface interaction between the gaming device and the remote player. Game results may also be packaged as IP datagrams and delivered to the remote player through this method.

Alternative embodiments may use connection-oriented protocols such as TCP, or a combination of connection oriented protocols and connectionless packet protocols such as IP. Transmission Control Protocol (TCP) is a transport layer protocol used to provide a reliable, connection-oriented, transport layer link among computer systems. The network layer provides services to the transport layer. Using a two-way handshaking scheme, TCP provides the mechanism for establishing, maintaining, and terminating logical connections among computer systems. TCP transport layer uses IP as its network layer protocol. Additionally, TCP provides protocol ports to distinguish multiple programs executing on a single device by including the destination and source port number with each message. TCP performs functions such as transmission of byte streams, data flow definitions, data acknowledgments, lost or corrupt data re-transmissions, and multiplexing multiple connections through a single network connection. Finally, TCP is responsible for encapsulating information into a datagram structure.

Static content comprising the game interface or other elements of the game may be delivered to the remote player device 110 and stored on the remote player device. This delivery of content may use a mixed-protocol as described above. A static image may be a fixed image or an animation activated by the remote control device. Such images may further be overlaid with additional game content such as images and sound that is delivered dynamically during game play.

In an embodiment of the invention, a central gaming controller 180 converts image and sound data comprising the gaming device interface and display from the remote machine into a data stream (for example but not limited to MPEG-2), encrypts it, and delivers it to the remote player device 110. The remote player interacts with the game using the remote player interface 300 to send commands back to the central gaming controller as IP datagrams. The IP datagrams may be interpreted by the central gaming controller 180 and used to proxy user interface interaction between the gaming device 160 and the remote player device 110. Game results may also be packaged as a data stream and delivered to the remote player through this method.

Figure 4:
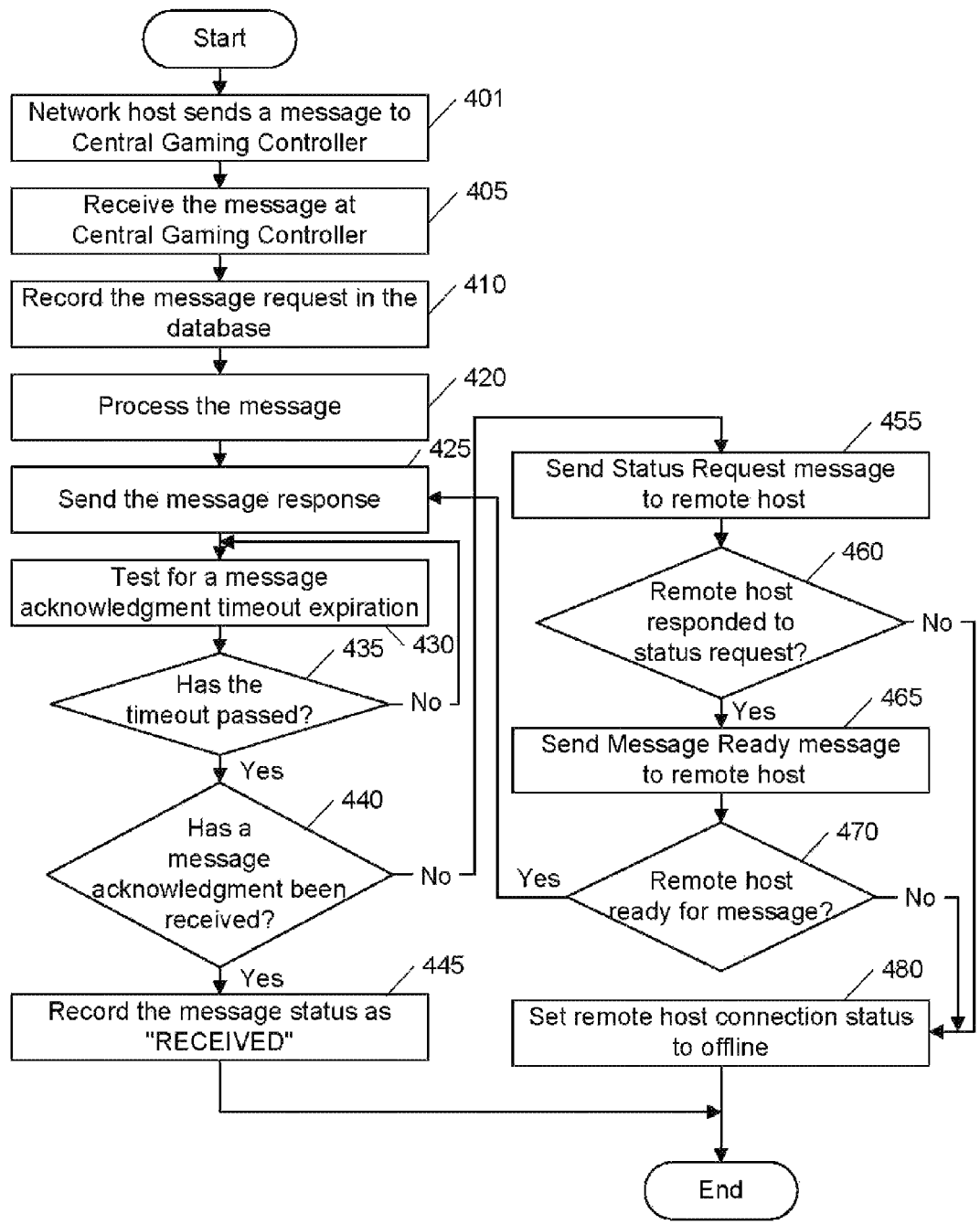
FIG. 4 is a flowchart depicting the sequence of events for acknowledging command messages in a gaming system as embodied in FIG. 1.

FIG. 4 is a flowchart depicting a method employed when a command message is acknowledged by a central gaming controller 180 according to one embodiment of a gaming system 100. Depending on the embodiment, additional steps may be added, others removed, steps merged, or the order of the steps rearranged. Note that in some embodiments, not all messages received by the central gaming controller 180 need be acknowledged. Starting at step 401, a command message is sent to the central gaming controller 180 by a host on the network. The host may be remote player device 110 used for remote play, or other authorized network devices. Next, at step 405, a qualified request message is received by the central gaming controller 180. Moving to step 410, the message is then recorded in a database. The database may be a casino database 170. Proceeding to step 415, the message is processed and a response prepared. Next at step 420, the response is recorded in the database. Moving to step 425, the response is sent back to the requesting device. At step 430, a test to determine whether an acknowledgment of the message has been received is made. Continuing at step 435, if the timeout value has passed control continues to step 440, if the timeout period has not expired control returns to step 430. Moving to step 440, whether the message has not been acknowledged by the originating host is tested. If acknowledgement has been received, control proceeds to 445, if not control proceeds to step 455. At step 445, the message status is recorded as "RECEIVED" and the process moves to the end state. Returning to step 455, where the process flow continues following an unacknowledged message, the system sends a status request message to the sending host. Next, at step 460, if the originating device responds to the message then flow continues to step 465, otherwise control moves to step 480. Moving to step 465, a diagnostic message is sent to query whether the originating device is ready to receive the original message. Next at step 470, if the originating host responds that it is ready to receive the original message, then control transfers to step 425 but if the originating host fails to respond then control moves to step 480. Moving to step 480, the status of the originating host is set to offline until such time as the originating host can respond or reinitializes, and the process moves to the end state.

Figure 5:
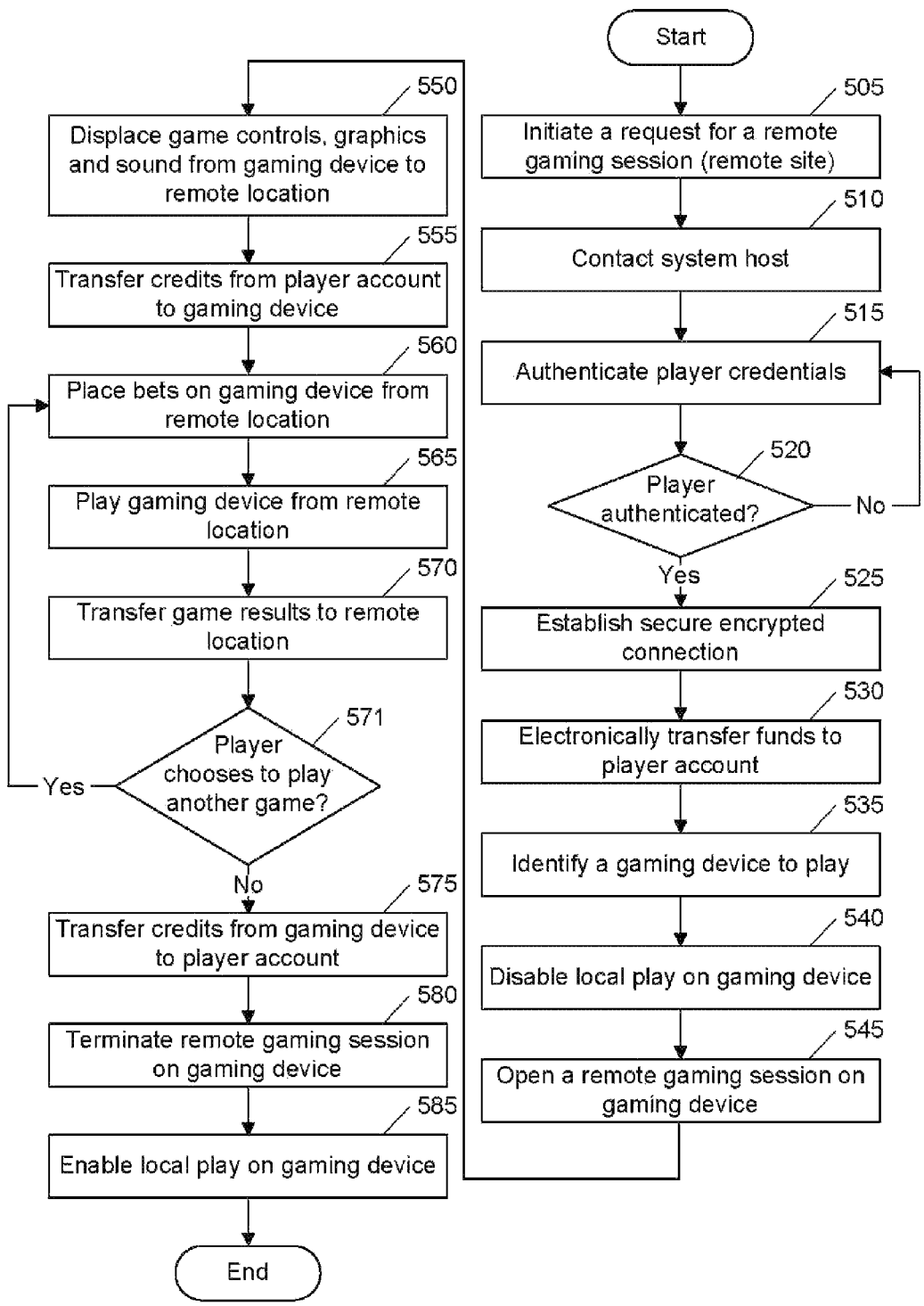
FIG. 5 is a flowchart depicting the sequence of events for establishing a remote gaming session, playing a game, and terminating the remote gaming session in a gaming system as embodied in FIG. 1.

FIG. 5 is a flowchart depicting a method used when a request for a remote gaming session is received, when playing a game, and when terminating the remote gaming session. Depending on the embodiment, additional steps may be added, others removed, steps merged, or the order of the steps rearranged. Starting at 510, a request for a remote gaming session is received as a request for a secured encrypted connection to the central gaming controller 180. Included in the request are the remote players security credentials in the form of a security certificate, for example, X.509 certificate. Next at 515, the security credentials are authenticated. This authentication may be performed by submitting the security certificate to a certificate authority for authentication. Moving to 520 if the player is not authenticated, control reverts to 515. Continuing to step 525, the central gaming controller 180 establishes a secure encrypted connection with the remote player device 110. Next, at step 530, if required the player transfers funds to use during the remote gaming session. Continuing to step 535, the player then chooses a host gaming device 160 to play. Next, at step 540, in one embodiment, when a host gaming device 160 is chosen for remote access play the local controls of the host gaming device 160 is disabled to prevent local play. Moving on to step 545, a remote play session is opened on the host gaming device 160. Continuing at step 550, after a remote gaming session is established on the host gaming device, the central gaming controller 180 sends a message to the host gaming device 160 instructing it to displace representations of its user controls, graphics and sounds to the remote player interface 300. The central gaming controller 180 directs the host gaming device 160 controls over the secured encrypted connection and manages the remote gaming session. Next at step 555, the remote player may transfer funds from a player account to the host gaming device 160 for wagering on the host gaming device 160. Moving to step 560, a wager is made. Next at, 656 a game is played. Continuing to step 570, the central gaming controller 180 delivers the results of the game to the remote player interface 300. Next at step 571, the remote player may repeat the sequence from step 560. Next at step 575, if there are any credits on the host gaming device 160 when the player terminates the remote gaming session, the central gaming controller 180 automatically transfers those credits back to the players account. Moving to step 580, the central gaming controller 180 terminates the remote gaming session with the host gaming device 160. Continuing to step 585, the central gaming controller 180, enables local play on the host gaming device 160, control is then transferred to the end state.

Figure 7:
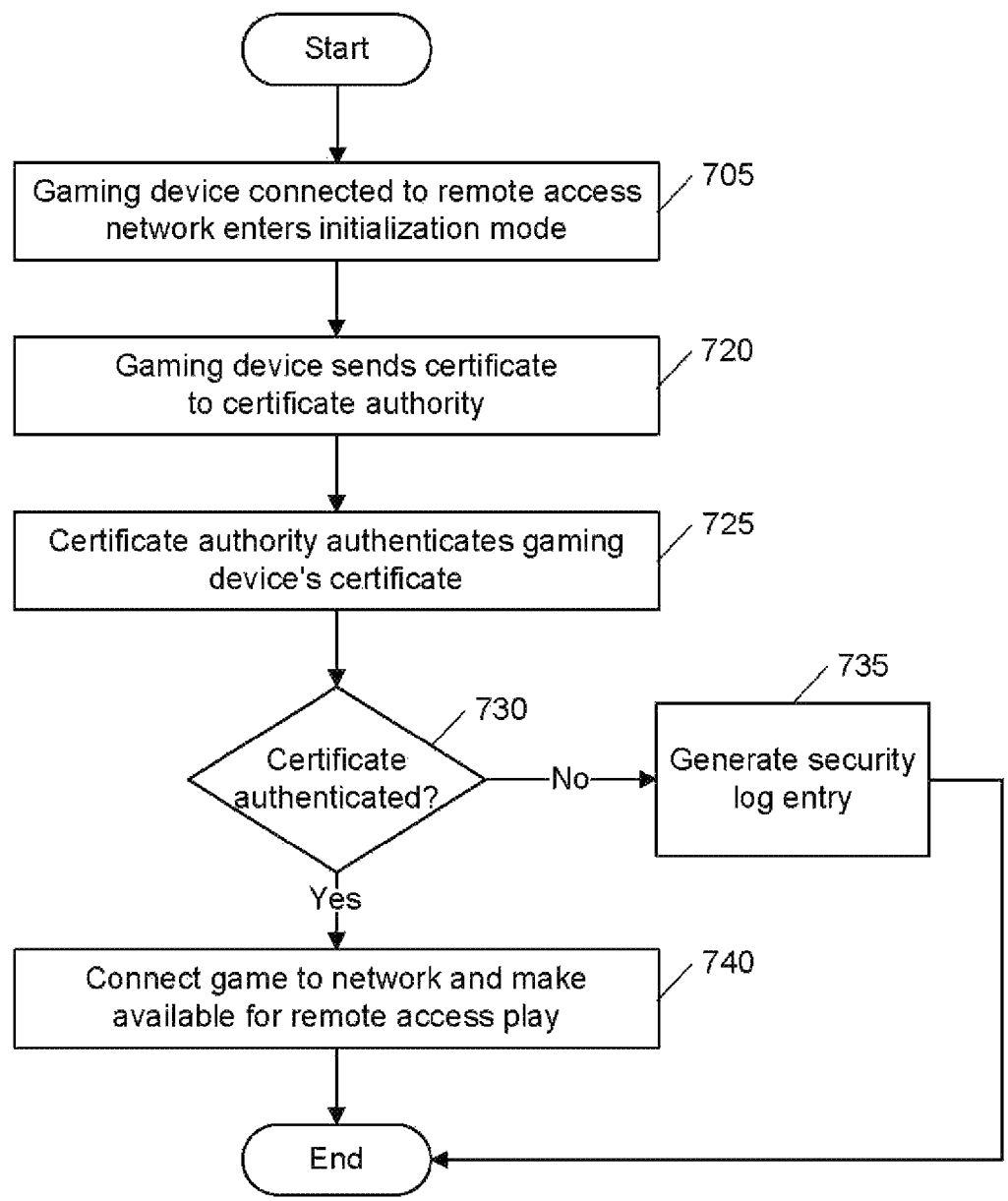
FIG. 7 is a flowchart depicting the sequence of events for a host gaming device of FIG. 2 to connect to a network using security certificates and a certificate authority.

FIG. 7 is a flowchart depicting a method for a host gaming device 160 to become connected to a network using security certificates and a certificate authority. Depending on the embodiment, additional steps may be added, others removed, steps merged, or the order of the steps rearranged. Starting at 705, a host gaming device 160 starts the process of connecting to a network as part of its initialization mode. Continuing to step 720, at a point during initialization, the host gaming device 160 submits a security certificate to a certificate authority for authentication. Moving to step 725, the certificate authority authenticates the certificate. Next at step 730, if the certificate is authenticated control moves to step 740, otherwise control moves to step 735. Continuing on to step 740, the host gaming device 160 is permitted onto the network and the process moves to its end state. Returning to step 735, if the certificate is not authenticated then a log entry is generated and the host gaming device 160 is not permitted onto the network.

Embodiments according to the invention may also use instant messaging and/or email messaging systems. Typical instant messaging systems permit computer users to type text messages and add file attachments into a host program and have the host program automatically deliver the text through a virtual direct connection to a target computer. Public email systems are those available for general use, as over the internet. Examples of public instant messaging systems in use today include but are not limited to chat programs like IRC, MSN Messenger, AOL Instant Messaging and a host of others. Private systems are restricted to a casino or gaming system. Typical email messaging systems permit messages and file attachments to be entered into a host program and addressed to a specific recipient on a network. These messages may not be delivered directly to the addressee, but are sent to a storage area where the recipient may retrieve the message at a time of their own choosing.

Gaming devices 160 and remote player devices 110 routinely exchange information with a central gaming controller 180 for, typically, but not limited to, account and game tracking functions. In one embodiment of the invention, devices may send and receive data over public and/or private email-type messaging systems. The message body of any particular message may vary, using a proprietary or non-proprietary format, and may be encrypted or in human-readable format. Messages may be sent at a time determined by the message originator, typically, but not exclusively, in response to an event. The recipient of the message may be any device capable of consuming the message. The message recipient may be responsible for checking the prescribed message storage area for messages addressed to it. The message recipient may reply to a received message or may generate a new message to a specific recipient, a group of recipients, or all recipients connected to the system. Remote player devices 110 may periodically check for new messages in the system and process them.

According to one embodiment of the invention, gaming devices 160 may send and receive data over public and/or private instant messaging systems. The message body of any particular message may vary, using a proprietary or non-proprietary format, and may be encrypted or in human-readable format. Messages may be sent at a time determined by the message originator, typically, but not exclusively, in response to an event. The recipient of the message may be any device capable of consuming the message. Both the gaming device 160 and the message recipient may queue incoming and outgoing messages. Queuing messages permits devices involved in instant message communications to accept new messages while processing received messages and to generate outgoing messages for delivery as system resources permit.

In another embodiment according to the invention, devices may send and receive data over public and/or private email-type messaging systems. The message body of any particular message may vary, using a proprietary or non-proprietary format, and may be encrypted or in human-readable format. Messages may be sent at a time determined by the message originator, typically, but not exclusively, in response to an event. The recipient of the message may be any device capable of consuming the message. The message recipient may be responsible for checking the prescribed message storage area for messages addressed to it. The message recipient may reply to a received message or may generate a new message to a specific recipient, a group of recipients, or all recipients connected to the system. Gaming system devices 110 and 160 may periodically check for new messages in the system and process them.

Embodiments according to the invention may present promotional messages during remote play sessions. Messages sent may comprise instant messages for promotional information, notification of events, or other pieces of information that can be communicated electronically. Promotional messages may also include jackpot and bonus information. A promotional message server may be used to construct and send promotional messages. In one embodiment, a computer server, comprising a central gaming controller 180, may also comprise the promotional message server.

A user interface may be provided to construct message templates. These templates are then used to construct a deliverable message. Embodiments of a message template may comprise a timeout value that indicates how long the message is to be displayed, the frequency with which the message displays in relationship to other scheduled messages, a limitation value that prevents the message from being displayed too often and an expiration date after which the message is no longer used in the system. Custom graphics and display modes may also be specified for a message template, such as icons, animations, and various scrolling methods.

A remote player device 110 may present a promotional message for an amount of time determined from the contents of the promotional message. The promotional message may be presented to a user in conjunction with gaming information. The presentation may contain icons, animations, and various scrolling methods. In addition multimedia such as sound and video may be utilized.

The promotional message server may also provide a dynamic data insertion function to insert player information such as the player's name or birthday into a message prior to delivery. Dynamic data insertion may be accomplished through the use of specialized tags within the message body. When encountered, the tag characters within the message are replaced with data from a related data source. The specific tag's character sequence is associated with a specific subset of the data in the data source, such as a player's name in a data source of player information. Processing comprises reading the data source and its subsets, parsing the specialized tags from the message template, indexing the data source and replacing the tag characters with data from the data source to create a deliverable message for each item in the data source. This sequence continues until all the data in the data source has been included in messages. The messages may be delivered as they are created or queued until all items in the data source have been used to create messages, then all messages may be sent at the same time.

In one embodiment, a gaming system 100 may comprise a card reader installed in a gaming device 280 or remote player device 380. Promotional messages may be based on information obtained about a player that is either stored on a card inserted into the card reader or by using identifying information from the card to access the casino's proprietary database systems 170.

One embodiment of the promotional message server may also provide a dynamic grouping function in which a subset of players currently gaming is selected and collected into a group. Casino operators may address a message template to this dynamic subset of current players and send a specific message or messages exclusively to that subset. These messages may be constructed using the dynamic data function. The dynamic grouping function may use criteria specified by the casino and available in the casino's proprietary database systems 170 and criteria generated by live gaming activity to establish a profile that players must meet to be selected. The criteria may comprise loyalty points the player has earned, a player's birthday, length of current gaming session, or other data that is collected by the casino on players and gaming activity.

The dynamic grouping function may be scheduled to run at time intervals determined by the casino. Each time the interval is reached the promotional gaming server searches for current players that meet the established criteria and builds a dynamic group then sends the assigned message to that group of players exclusively. The gaming devices 160, remote player device 110, card readers installed in gaming devices 280 and remote player device 380, and casino proprietary database systems 170 may provide data to search for players that meet the specified criteria and assemble them into a dynamic group.

In one embodiment of the invention, the casino may advertise a casino sponsored event. The casino may use a user interface display to construct the message and schedule its delivery start time, duration of the message e.g. number of hours, days, weeks, or months that the message will run, and specific values that weight the message's delivery interval and frequency amongst other promotional messages scheduled in the system. The style of message may also be specified, including but not limited to flashing, scrolling, scroll direction, and the use of custom graphics. The casino operator may also specify the criteria players must meet to receive the message. Once the casino operator accepts the promotional message configuration, the promotional message server may deliver the message across a network to remote player devices 110 or host gaming systems 160.

An embodiment of a gaming system 100 may provide for the electronic transfer of funds to a gaming device for the purpose of making wagers. When a player chooses a gaming device 160 to play remotely, funds are electronically transferred to the gaming device and appear as credits on the gaming device 160. The player then uses those credits to make wagers on game outcome. When the player is finished, the system transfers any remaining credits on the gaming device back to the source of funds or to an alternate storage. Limitations on the amount of funds transferred may be set for a minimum or maximum amount transferred, a minimum or maximum amount transferred within a given time period, or a minimum or maximum amount transferred for the life of the account, or a combination of any of these. The limitation may also vary between accounts, permitting one account to have a different limitation on transfers than another. When the limitation set is reached, further transactions are prevented until the limitation is resolved. The limitation may be set voluntarily by the player, by the casino, or by a gaming authority. Limitations may be set for all players within a specific jurisdiction or for selected players only. The source of funds used by a player for remote access play may be maintained in a database located on a computer that is directly or indirectly connected to the casino network 150.

Figure 6:
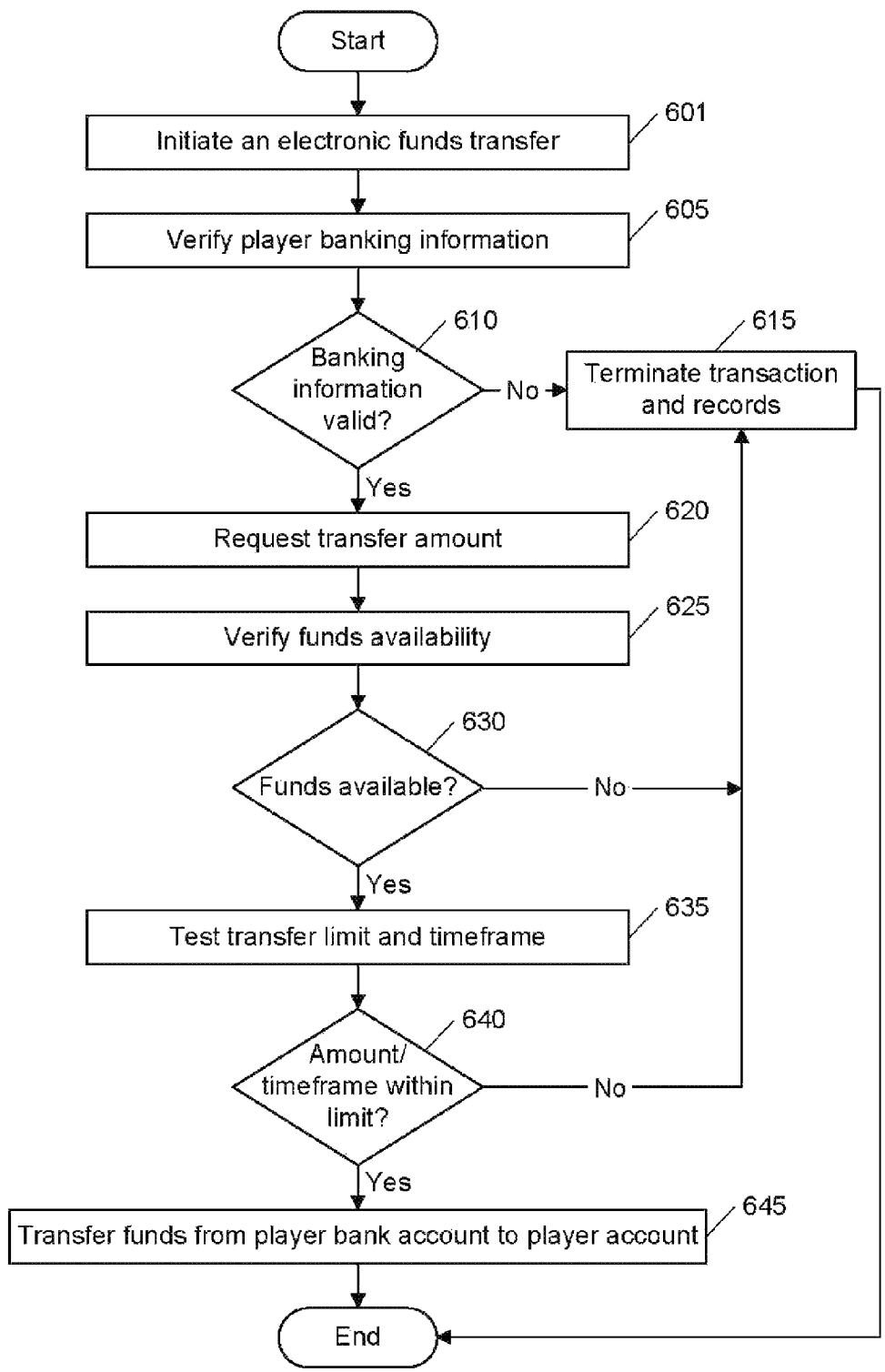
FIG. 6 is a flowchart depicting the sequence of events for transferring funds from a player's source of funds in the gaming system of FIG. 1.

FIG. 6 is a flowchart depicting an embodiment of the invention whereby a player transfers funds from a bank account to a player account for the purpose of wagering on games. Depending on the embodiment, additional steps may be added, others removed, steps merged, or the order of the steps rearranged. Starting at step 601, a remote player device 110 initiates an electronic funds transfer. Continuing to step 605, the central gaming controller 180 verifies the remote players banking information. Next at step 610, if the banking information is valid, control transfers to step 620, otherwise control moves to step 615. Continuing at step 620, the remote player device 110 prompts the player to enter the amount of the transfer. Moving to step 615, the central gaming controller 180 verifies fund availability. Next at step 630, if funds are not available control moves to step 615. Otherwise, control moves to step 635, where, in a one embodiment, the central gaming controller 180 may consult a casino database 170 and determine whether the remote players total gaming activity exceed limits placed on that activity. Next at step 640, if the limit is reached control moves to step 615. Otherwise, continuing at step 645, the transfer is completed. Returning to step 615, if the players banking information is not correct, funds are not available or a transfer limit is reached, then the transaction is canceled and control transferred to the end state.

An embodiment of a gaming system 100 may record the interaction between remote players and host gaming devices 160 during remote gaming sessions for the purpose of resuming games in-progress after a communications failure. If at anytime the connection between the remote player and a gaming device becomes unavailable, the system has a sufficient record of player positions to restart the game as at the time just prior to the failure. Thus an embodiment of a gaming system may record, transfer, and reinstate on a like device an encrypted block of data representing the precise state of a particular gaming device 160 at the time that the data block is requested. The encrypted block of data is generated by the gaming device 160 and transferred using a communication protocol. The encrypted block of data may be used to continue a game in-progress that was interrupted by a gaming device 160 failure or other system failure. In addition, the payer's wager and credit data along with gaming payout data may be included in the data block. The data may also be transported to another gaming device 160 for the purpose of completing an interrupted game or resuming a gaming session. The destination gaming device 160 receives the encrypted block of data, decrypts it, and loads the game state into its own systems, allowing a game in-progress to complete or a game session to continue.

Figure 8:
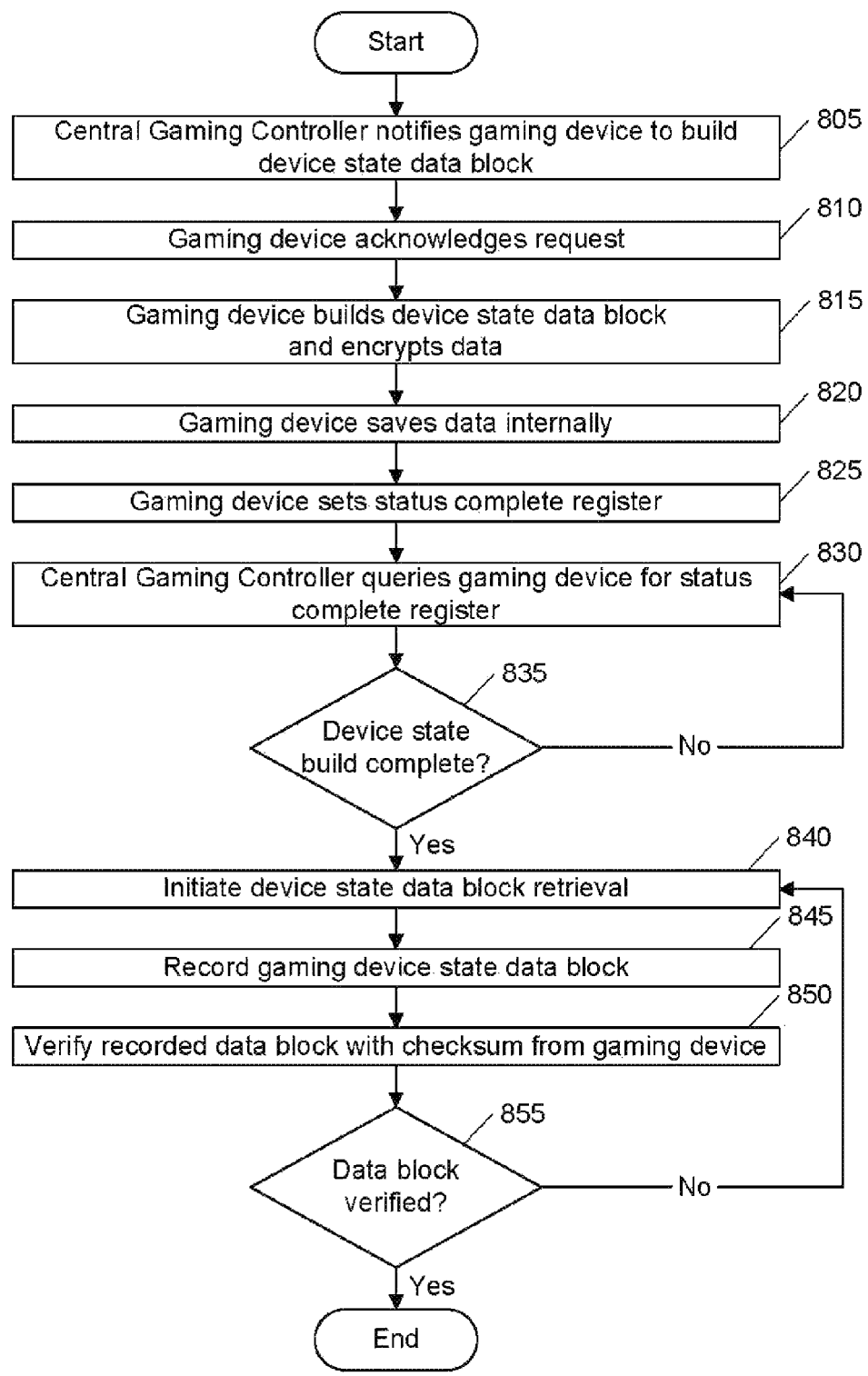
FIG. 8 is a flowchart depicting the sequence of events for a gaming device of FIG. 2 to build and deliver an encrypted block of data representing the complete state of the gaming device.

FIG. 8 is a flowchart depicting a method for a gaming device 160 to build and deliver an encrypted block of data representing the complete state of the gaming device. Depending on the embodiment, additional steps may be added, others removed, steps merged, or the order of the steps rearranged. Starting at 805, a central gaming controller 180 sends a message to a host gaming device 160 to initiate the build of the encrypted data block. Continuing to step 10, the gaming device responds with an acknowledgement. Next, at step 815, the gaming device 160 begins the build process. When finished with the build and encryption process, at step 820, the gaming device saves the data block to non-volatile memory in the gaming device. Continuing to step 825, the gaming device 160 sets an indication that may be queried by the central gaming controller 180 as to the status of the build/encryption process. Moving to step 830, the central gaming controller 180 checks the gaming device's status. Next at step 835, if the build/encryption process is complete, control continues to step 840, otherwise control returns to step 830. Moving to step 840, the central gaming controller 180 retrieves the data block from the gaming device 160. Next, at step 845, when the central gaming controller 180 has retrieved the data block it saves the data block to a database. Continuing to step 850, the central gaming controller then checks the validity of the saved data block. If the data block is not verified then the central gaming controller initiates another retrieval by returning control to step 840.

Figure 9:
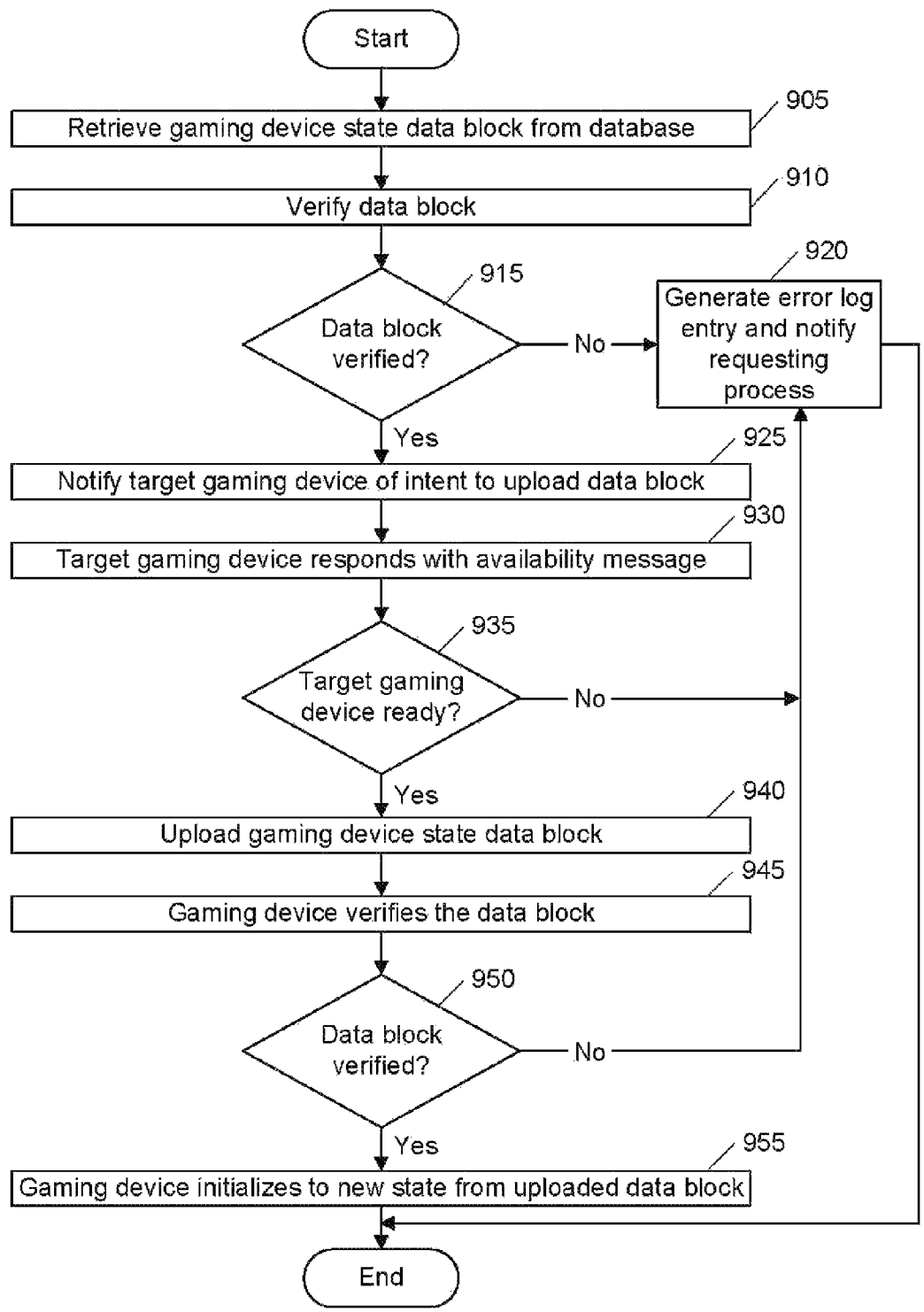
FIG. 9 is a flowchart depicting the sequence of events for retrieving a block of data representing the state of a gaming device from a database and loading the block into a gaming device as performed by a gaming system embodiment as in FIG. 1.

FIG. 9 is a flowchart depicting a method for retrieving an encrypted block of data representing the state of a gaming device from a database and loading the encrypted block into a gaming device. Depending on the embodiment, additional steps may be added, others removed, steps merged, or the order of the steps rearranged. Starting at step 905, the central gaming controller 180 retrieves a saved encrypted data block from the database. Next at 910, the controller 180 verifies the integrity of the data block. Continuing to 915, if the data block is verified, control continues to step 925, if not control moves to step 920. Returning to the flow of control at 925, the central gaming controller 180 notifies a target gaming device 160 of an intent to upload the data block. Next, at step 930, the target gaming device 160 responds with a message indicating whether it is available for the upload. Moving to step 935, if the target device is ready control moves to step 940, if not control is diverted to step 920. Returning back to step 940, the encrypted data block is uploaded to the target gaming device 160. Next at step 945, the target gaming device 160 verifies the encrypted data block. Moving on to step 950, if the data block was verified, the gaming device moves on to step 955, if not verified, control moves to step 920. Continuing on to step 955, the gaming device 160 initializes its state to the new state defined by the received data block and the process moves to the end state. Returning back to step 920, which is reached on error conditions, an error log entry is generated and the requesting process notified.

FIG. 10 is a block diagram depicting one embodiment of a gaming system according to the present invention wherein the host gaming devices 160 are available for remote play over a network that connects to a cable modem termination system. The cable modem termination system 1005 is located at the head-end of a cable television provider who makes broadband network connectivity available as a service to its customers. Cable television customers who subscribe to broadband or digital television services access the remote network 120 through a digital home communications terminal (DHCT) 1000. The remote player device 110 may be a stand-alone cable modem or a set-top box that includes a cable modem and a digital television broadcast decoder. The DHCT 1000 may, in some embodiments include the remote player device 110. The remote player interface 300 may be any device or combination of devices that remote players operate to interact with the remote player device 110, for example, a television with remote control or a personal computer. To connect to the central gaming controller 180, a remote player uses the remote player device 110 to send messages, using, in one embodiment, IP datagrams, through the DHCT and the cable modem termination system 1005. The cable modem termination system 1005 uses a network router 1004 to route the IP datagrams over a network connection 140 to the central gaming controller 180. The backbone network connection 140 can be any type of network connection such as a dedicated Ti or fiber optic over which network traffic can be exchanged. In preferred embodiments the backbone network 140 is part of a closed loop network. However, in other embodiments, a public network such as the Internet may form at least a portion of the backbone network. Encryption of the data may be performed, either at the endpoints such as remote player device 110, at a host gaming device 160, at a central gaming controller 180, over network 120, or only over network 140.

Network traffic from the remote network 120 and backbone network 140 travels over a number of virtual local area networks (VLAN) configured using a multilayer network switch 1022. Segmenting the internal network into VLANs creates security zones whereby only permitted network traffic appears on a given VLAN.

IP datagrams are received over the backbone network 140 through network router 1020 and firewall 1021. Network router 1020 filters IP datagrams that are not coded with the configured port for access to the gaming network 150. If an IP datagram passes the network router 1020 it then must pass the firewall 1021 in order for the IP datagram to be processed by the request processing server(s) 1023 which comprise a portion of a central gaming controller 180 in this embodiment.

The firewall 1021 has two network interfaces 1050, 1051; the external-facing network interface 1050 is connected to the router 1020 and the internal-facing network interface 1051 is connected to the multilayer network switch 1022. In this configuration the firewall 1021 acts as a type of network switch that may perform additional security checks on the IP datagram, then move the datagram to the internal-facing network interface 1051 where the multilayer network switch 1022 moves the datagram to the VLAN where request processing server(s) 1023 are located.

Each request processing server 1023 has two network interfaces 1052, 1053, both connected to the multilayer network switch 1022. Each network interface 1052, 1053 may be configured on a different VLAN of the multilayer network switch 1022. The multilayer network switch 1022 moves IP datagrams between the firewalls 1021 internal-facing network interface 1051 and the request processing server(s) 1023 external-facing network interface 1052. This embodiment provides a layer of protection for the host gaming devices 160 in the event that the request processing server(s) 1023 are compromised.

When an IP datagram arrives at a request processing servers 1023 external-facing network interface 1052, the request processing server 1023 interprets the IP datagram and issues commands over its internal-facing network interface 1053 to the application server 1027. The request processing server 1023 may reject invalid commands or make other determinations as to the appropriateness of a request that prevent the request from being passed on to the application server 1027. Likewise, the request processing server 1023 may request data from the application server for use in building its own response to the request, which may or may not require an acknowledgement from the remote player device 110 as described below.

Command messages received by the application server 1027 may be recorded in a database using the database server 1025. The application server 1027 then executes the command, which may include any function relevant to the operation of the host gaming device 160 and may or may not return data to the request processing server 1023 for delivery to the remote access player. In one embodiment, the database server 1025 may comprise the casino database 170. In other embodiments the database server 1025 and the application server 1027 may comprise the casino database 170.

Some commands may require the remote player device 110 to acknowledge the receipt of information sent from the central gaming controller 180. For commands that require acknowledgement, the central gaming controller 180 queues the status of the messages that are sent to the remote player device 110. The status of messages sent but not acknowledged is stored in a database as "open" using the database server 1025. When the remote player device 110 receives the message it sends an acknowledgment message back to the central gaming controller, which in turn marks the message in the database as "closed"; indicating that the message has reached its destination and has been acknowledged. If the message is not acknowledged within a specified timeout, the message is resent. FIG. 4 depicts the sequence of events for the receipt, queuing and response loop for qualifying messages.

Recording of messages between the remote player device 110 and a host gaming device 160 by the central gaming controller 180 allows each game or transaction, on both the host gaming device 160 and remote player device 110, to be recorded. This allows each host gaming device or remote player device to be individually auditable using standard accounting practices in the gaming jurisdiction where the game is located. In one embodiment, a third party, such as a gaming authority may be sent the records of games and transactions online by the gaming system 100.

When the application server 1027 receives a command request that requires communication with gaming devices 160, 161, 162 it connects to those devices using terminal server 1035. Terminal server 1035 provides Ethernet connectivity to the RS232 serial interface 1054 of the game. Through that interface the remote player device 110 communicates to the gaming devices 160, 161, 162 using a communications protocol supplied by the gaming machine manufacturer. The protocol includes commands that permit the remote operation of the gaming devices 160, 161, 162 and the reporting of game results so that the application server 1027 can control remote play.

Figure 11:
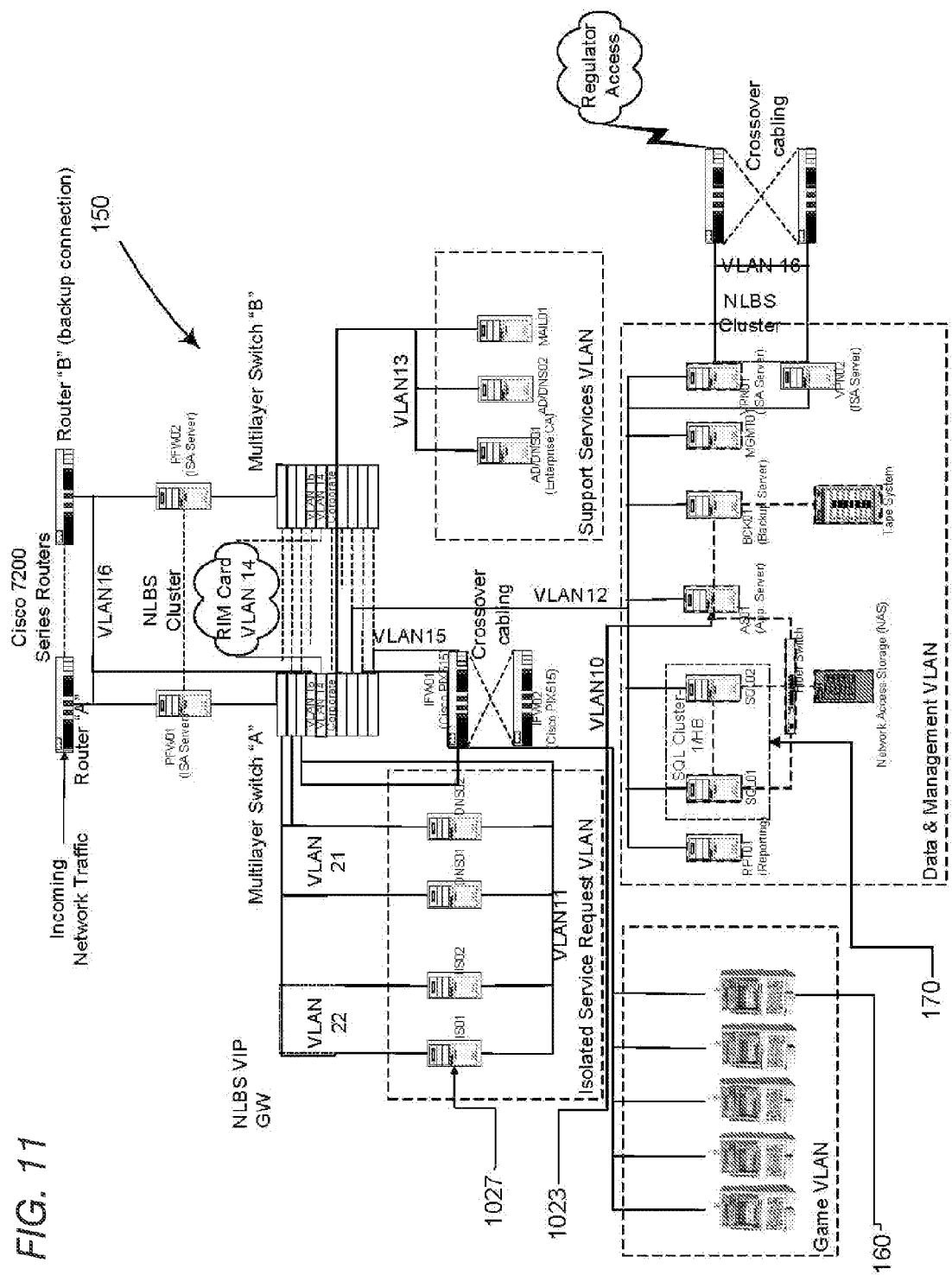
FIG. 11 is a detailed block network diagram of a portion of a gaming system as depicted in FIG. 10.

FIG. 11 depicts a more detailed network diagram of one embodiment of network 150 and elements of a gaming system 100 connected to network 150. This includes a host gaming device 160, and a database 160. As in the embodiment of FIG. 10, a central gaming controller 180 may be comprised of request processing servers 1027 and an application server 1023 connected to one or more VLANs of network 150.

Universal Gaming Engine

Figure 12:
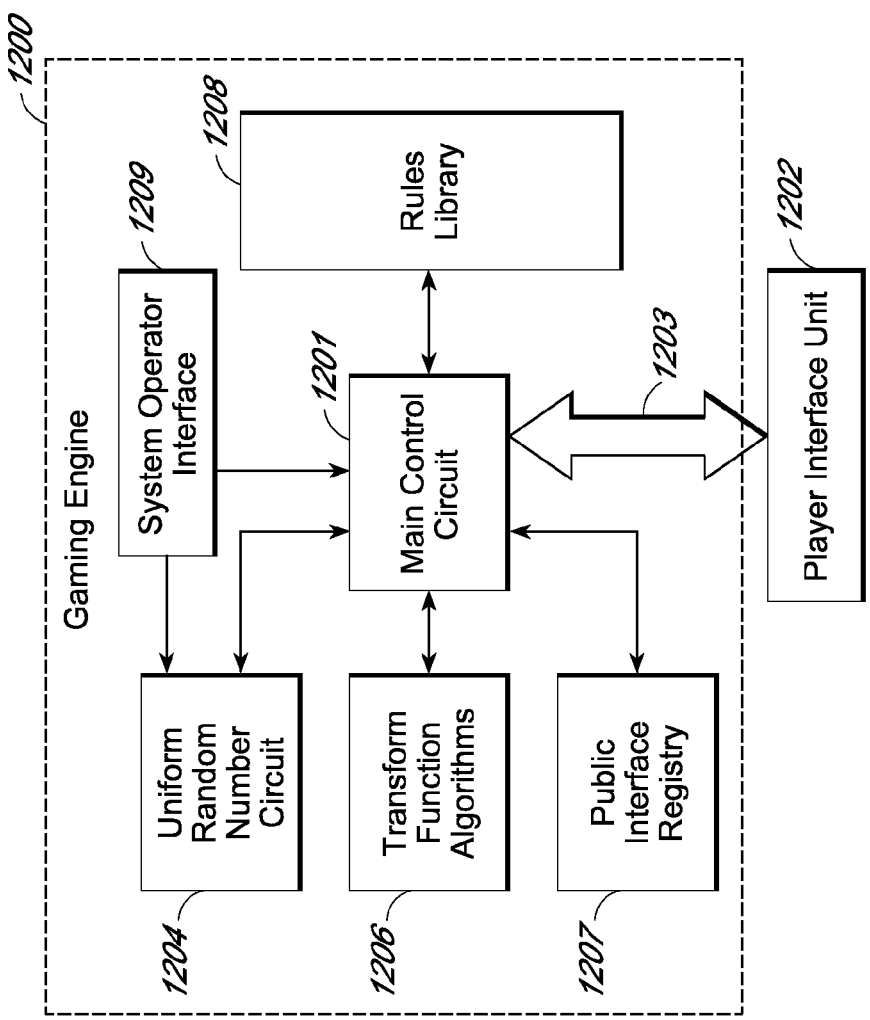
FIG. 12 illustrates a simplified block diagram of the gaming engine in accordance with the present invention.

FIG. 12 illustrates, in simplified schematic form, a gaming apparatus in accordance with the present invention. The gaining apparatus in accordance with the present invention is also referred to as a "universal gaming engine" as it serves in some embodiments as a platform for implementing any number of games having deterministic and random components. In other embodiments, the universal gaming engine in accordance with the present invention provides a platform that supports multiple players across a network where each player preferably independently selects which game they play and independently controls progression of the game.

Although in the preferred embodiment all of the games discussed are implemented entirely electronically, it is a simple modification to alter the player interface to include mechanical switches, wheels, and the like. Even in mechanically implemented games electronic functions that are performed by the gaming engine in accordance with the present invention are required. Hence, these mechanical machines are greatly simplified using the gaming engine in accordance with the present invention.

Gaming engine 1200 is illustrated schematically in FIG. 12, including major subsystems in the preferred embodiments. Each of the subsystems illustrated in FIG. 12 is described in greater detail below. FIG. 12, however, is useful in understanding the overall interconnections and functioning of the gaming engine in accordance with the present invention.

Gaming engine 1200 performs several basic functions common to many electronically implemented casino games. The most basic of these functions includes interacting with the player to detect player initiated events, and to communicate the state of a game to the player. Gaming engine 1200 must process the player initiated event by determining the appropriate rules of the game that must be executed and then executing the appropriate rules. Execution of the rules may require only simple calculation or retrieving information from memory in the case of deterministic rules, or may require access to pseudo-random values or subsets of pseudo-random values in the case of non-deterministic components.

Gaming engine 1200 in accordance with the present invention uses a main control circuit 1201 to control and perform basic functions. Main control circuit 1201 is a hardware or software programmable microprocessor or microcontroller. Alternatively, main control circuit 1201 can be implemented as an ASIC device with dedicated logic to perform the required control functions. Main control circuit 1201 communicates with player interface unit 1202 via interface bus 1203. Player interface unit 1202 is a machine having at least some form of display for communicating information to the player and some form of switch (i.e., buttons, levers, keyboard, coin slot, or the like) for communicating information from the player.

Player interface unit 1202 generates a player record of information and transmits the player record over bus 1203 to main control circuit 1201. The player record of information contains information about the player initiated event as well as any data that may be associated with the particular event. For example, a player initiated event may be drawing two cards from a deck of cards. The player record will include information about the event (i.e., drawing cards), and data (i.e., two cards). The player record may include other information such as the state of the game that is being played. By "state of the game" it is meant at which stage in the rule defined progression of the game the game currently exists. State information may be maintained by gaming engine 1200 or player interface unit 1202, or both.

Main control circuit 1201 responds to a player initiated event by referencing a public interface registry 1207. Public interface registry 1207 is essentially a lookup table implemented in volatile, semi-volatile, or non-volatile memory. Public interface registry 1207 is desirably organized as an addressable memory where each address is associated with a mapping record. Main control circuit 1201 uses the player event portion of the player record to address public interface registry 1207 in a preferred embodiment. Public interface registry 1207 then provide a selected mapping record to main control circuit 1201. Main control circuit 1201 uses the selected mapping record to address rules library 1208.

Rules library 1208 is essentially an addressable memory preferably allowing random access. Rules library 1208 can be implemented in volatile, semi-volatile, or non-volatile memory of any convenient organizational structure. Rules library 1208 responds to the address from main control circuit 1201. by supplying one or more rules, which correspond to game rules, to main control circuit 1203. The rules provided by rules library 1201 are preferably executable instructions for main control circuit 1201.

Main control circuit 1201 processes the selected rules by selectively accessing random number circuit 1204 and transform function algorithms 1206. As set out herein before, completely deterministic rules may be executed entirely within main control circuit 1201 by simple calculations or data transfer operations. Where the selected rule requires main control circuit 1201 to access one or more pseudo-random numbers, random number circuit 1204 is accessed. In the preferred embodiment random number circuit 1204 provides a series of pseudo-random numbers of arbitrary length having uniform distribution as described in greater detail hereinafter.

Often times, however, a rule will require a non-uniform distribution of pseudo-random numbers, or some subset of a series of pseudo-random numbers. In this case, main control circuit 1201 implements the selected rule by accessing transform function algorithms from block 1206 in FIG. 12. The transform function algorithms transform the series of uniformly distributed pseudo-random numbers from random number circuit 1204 by 1) transforming them into a non-uniform distribution, 2) using a given set of the uniformly distributed pseudo-random numbers to performing set selection permutations or 3) both.

In this manner, the basic functions of pseudo-random number generation, pseudo-random number transformation, and association of rules with player or player events are standardized and entirely contained in gaming engine 1200. System operator interface 1209 is used by the casino or game developer to communicate with uniform random number circuit 1204 and main control circuit 1201. This communication is desirable to initialize, program, and maintain main control circuit 1201 and public interface registry 1207, for example. System operator interface also enables an operator to initialize, monitor and change seed values and key values used by uniform random number circuit 1204. Any convenient hardware may be used to implement system operator interface 1209 including DIP switches, a smart terminal, personal computer, or a dedicated interface circuit.

To implement a game, a game programmer develops a series of rules for the game. The series of rules are stored as a volume in rules library 1208. The game programmer will then register the new game in public interface registry 1207 by storing the location of the volume of rules in an appropriate address in public interface registry 1207. The game programmer does not need to program or develop the random number circuit or transform algorithms to implement a new game. Further, the player using player interface unit 1202 can access any of the games stored in rules library 1208. To certify a new game, a game regulatory authority need only review the rules in the rules library 1208 to verify that they follow the established rules for a particular game. This verification can be easily done by reviewing high-level language code such as FORTRAN, C, or Basic.

While the present invention is described in terms of the preferred implementation of casino games it should be understood that any game which has a random component and progresses by following pre-defined rules can be implemented in gaming engine 1200. Player interface unit 1202 may be entirely electronic or combine electronic and mechanical components. Player interface unit may supply any amount and kind of information in addition to the basic functions set forth above to main control circuit 1201. Player interface unit 1202 may be located in the same physical machine as the remaining portions of gaming engine 1200 or may be located at a great distance from gaming engine 1200. These and other alternatives will be discussed in greater detail hereinafter.

Random Number Circuit

Figure 13:
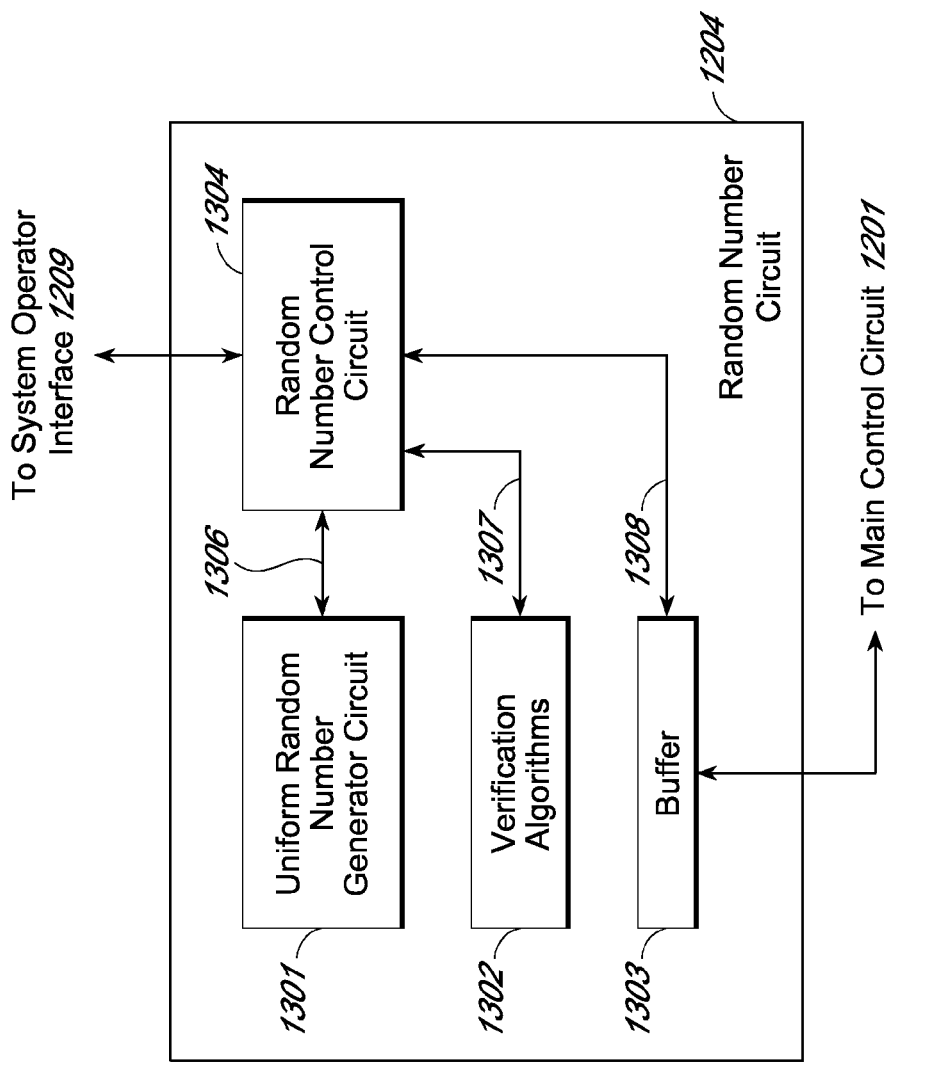
FIG. 13 illustrates a block diagram of the pseudo-random number subsystem in accordance with the present invention.

A preferred random number circuit 1204 is shown in FIG. 13. Random number circuit 1204 preferably includes random number generator circuit 1301, verification algorithms 1302, and buffer 1303. Random number circuit 1204 is controlled by random number control circuit 1304 which is a microprocessor, microcontroller, or dedicated logic control circuit.

Random number generator circuit 1301 provides a stream of uniformly distributed pseudo-random numbers on output 1306. Alternatively, random number generator circuit 1301 can provide parallel outputs on output 1306. Also, more than one random number generator circuit 1301 may be employed depending on the quantity of pseudo-random numbers demanded by the system.

Random number generator circuit 1301 preferably supplies uniformly distributed pseudo-random numbers because a set of uniformly distributed numbers can be transformed easily by transform algorithms 1206 into non-uniform distributions and combinatorial subsets. A preferred circuit for implementing random number generator circuit 1301 is an ANSI X9.17 pseudo random number generator based upon a plurality of data encryption standard (DES) encryption circuits. Alternatively, random number generator circuit 1301 may be implemented using the international data encryption algorithm (IDEA) encryption. Other random number generator circuits are known. When implementing other random number generator circuits 1301, however, it should be appreciated that a high quality, cryptographically strong pseudo-random number generator is preferable. A major advantage of the present invention is that the random number circuit 1204 need be implemented only once to serve a plurality of games making it cost efficient to use relatively expensive circuitry to provide a high quality random numbered circuit 1204.

Random number generator circuit 1301 accepts as input one or more key values which are typically binary values having a fixed relatively large number of bits. For example, the ANSI X9.17 pseudo-random number generator uses 56-bit keys. Random generator circuit 1301 also usually accepts a seed value, which is also another large bit binary value. Further, random number generator circuit 1301 has a data input or clock input that accepts a continuously variable signal which is conveniently a clock representing date and time. In this manner, each time the signal on the clock or data input changes a new random number is output on line 1306. Random number control circuit stores and provides the key values, seed value, and clock values to random number generator circuit 1301.

A desirable feature in accordance with the present invention is that random number circuit 1204 be able to boot up after a power fault (i.e., power is removed from the system) using the same seed values, key values, and clock value that existed before the power fault. This feature prevents a player or operator from continually resetting the system or gaining any advantage by removing power from gaming engine 1200. One way of providing this functionality is to buffer the key values, seed values, and clock values in memory within random number control circuit 1304 before they are provided to random number generator 1301. After a power on default, circuit 1204 can reboot autonomously using the values stored in buffers. Alternatively, new values can be provided via system operator interface 1209 to ensure that the output after a power fault is in no way predictable based upon knowledge of output after a prior power fault.

In a preferred embodiment, random number generator circuit operates continuously to provide the series of random numbers on line 1306 at the highest speed possible. By continuously, it is meant that random number generator circuit 1301 operates at a rate that is not determined by the demand for random numbers by the rest of the system. Random number control circuit 1304 provides key values, seed values, and data values to random number generator circuit 1301 independently of any processing demands on main control circuit 1201 (shown in FIG. 12). This arrangement ensures that random number circuit 1204 operates at a high degree of efficiency and is not slowed down by computational demands placed on main control circuit 1201. In other words, the control circuit resources that implement random number control circuit 1304 are independent of and usually implemented in a separate circuit from main control circuit 1201.

Random number control circuit 1304 accesses one or more verification algorithms 1302 via connection 1307. Verification algorithms 1302 serve to verify that the raw random numbers on line 1306 are statistically random to a predetermined level of certainty. Preferably, verification algorithms 1302 include algorithms for testing independence, one-dimensional uniformity, and multi-dimensional uniformity. Algorithms for accomplishing these tests are well known. For example, independence of the pseudo random numbers can be performed by a Runs test. Uniformity can be verified by the Kolmorgorov-Smirnov or K-S test. Alternatively, a Chi-square test verify uniformity. A serial test is an extension of the Chi-square test that can check multi-dimensional uniformity.

Random number control circuit 1304 preferably receives and stores a set of raw random numbers from random number generator circuit 1301. The set of raw random numbers can be of any size, for example 1000 numbers. Random number control circuit 1304 then implements the verification algorithms either serially or in parallel to test independence and uniformity as described hereinbefore. It may be advantageous to use more than one physical circuit to implement random number control circuit 1304 so that the verification algorithms may be executed in parallel on a given set of raw random numbers.

If a set of raw random numbers do not pass one of the verification tests the numbers are discarded or overwritten in memory so that they cannot be used by gaming engine 1200. Only after a batch of numbers' passes the battery of verification tests, are they passes via line 1308 to verify random number buffer 1303. Buffer 1303 is preferably implemented as a first-in, first-out (FIFO) shift register of arbitrary size. For example, buffer 1303 may hold several thousand or several million random numbers.

By integrating verification algorithms 1302 in a random number circuit 1204, gaming engine 1200 in accordance with the present invention ensures that all of the pseudo-random numbers in buffer 1303 are in fact statistically random. This overcomes a common problem in pseudo-random number circuits wherein the random numbers are long-term random, but experience short-term runs or trends. These short-term trends make prediction of both the player and casino odds difficult and may create an illusion of unfairness when none in fact exists. The verification algorithms 1302 in accordance with the present invention largely eliminate these short-term trending problems and create a pool of random numbers in buffer 1303 that are both statistically random and will appear to be random in the short run time period in which both the casino and players operate.

Buffer 1303 makes the random numbers available continuously to main control circuit 1201. Main control circuit 1201 may access any quantity of the numbers in buffer 1303 at a time. Buffer 1303 also serves to provide a large quantity of random numbers at a rate higher than the peak generation rate of random number generator circuit 1301. Although it is preferable that random number generator circuit 1301 and verification algorithms 1302 are processed so as to provide random numbers to buffer 1303 at a higher rate than required by gaming engine 1200, short-term bursts of random numbers can be provided by buffer 1303 at a higher rate.

Transform Function Algorithms

Figure 14:
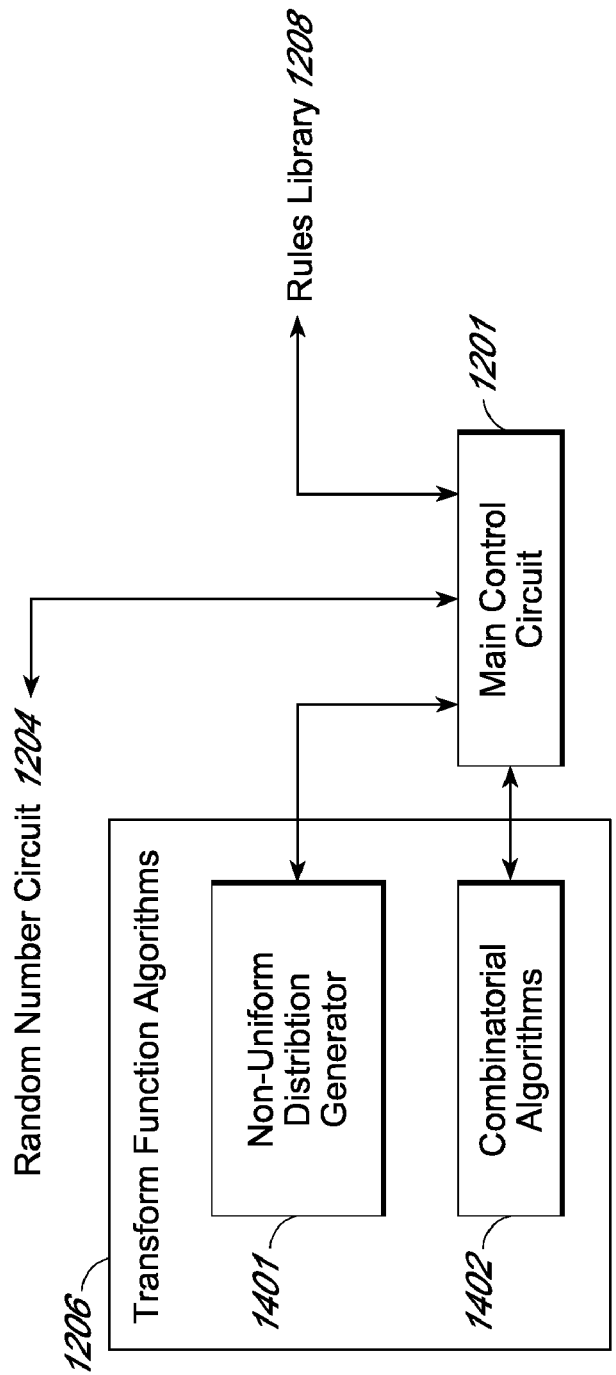
FIG. 14 illustrates the non-uniform distribution generator and combinatorial algorithm subsystems in accordance with the present invention.

Transform function algorithms 1206 are accessed by main control circuit 1201 as illustrated in FIG. 14. Examples of transform function algorithms 1206 are a non-uniform distribution generator 1401 and combinatorial algorithms 1402. To execute some rules obtained from rules library 1208, main control circuit 1201 may be required to select one or more random values from a non-uniform distribution. Examples of non-uniform distributions are normal distribution, exponential distribution, gamma distribution, as well as geometric and hypergeometric distributions. All of these non-uniform distributions can be generated from the uniform distribution provided by random number circuit 1204.

Rule implementations primarily require that main control circuit 1201 access a series of pseudo-random numbers in the context of random set selection and permutations. This subset selection is performed by combinatorial algorithms 1402. The combinatorial algorithms 1402 operate on either the uniform number distribution provided directly by random number circuit 1204 or the non-uniform distribution provided by non-uniform distribution generator 1401. In this manner, a game of keno can be implemented by selecting a random 20 from a group of 80.

Another function of the transform algorithms 1206 is to scale and center the series of random numbers. For example, a deck of cards includes 52 cards so that the set of random numbers must be scaled to range from 1 to 52. These and similar transform functions are well known.

An advantageous feature of the present invention is that these transform functions can be implemented a single time in a single piece of software or hardware and selectively accessed by any of the games in rules library 1208. This allows a great variety of transform functions to be provided in a cost efficient and computationally efficient manner. The game designer need only provide rules in rules library 1208 that access appropriate transform function algorithms 1206 and need not be concerned with the details of how the transform function algorithms 1206 are implemented. Similarly, a gaming regulatory authority can verify the correctness and fairness of transform algorithms a single time by providing extensive testing. Once the transform functions are verified, they need not be verified again for each game that is implemented in rules library 1208. This independence between the rules programming and the non-deterministic programming result in highly standardized and reliable games while allowing the games designer greater flexibility to design a game in the rules library 1208.

Main Control Circuit

Figure 15:
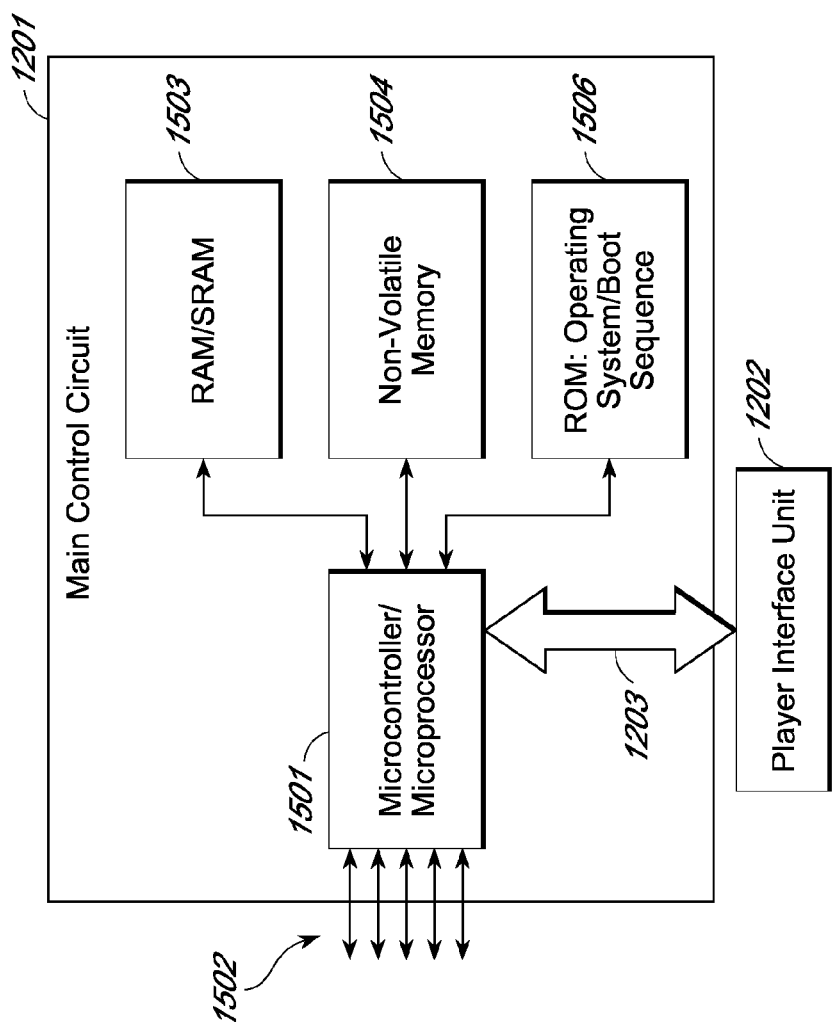
FIG. 15 illustrates a main control circuit in accordance with the present invention.

A preferred embodiment of main control circuit 1201 is shown in block diagram form in FIG. 15. Preferably, a microcontroller microprocessor 1501 is provided to perform calculations, memory transactions, and data processing. Microprocessor. 1501 is coupled through bus 1203 to player interface unit 1202. Microprocessor 1501 is also coupled to player number circuit 1204, transform function algorithms 1206, public interface registry 1207, and rules library 1208 through bi-directional communication lines 1502.

In a typical configuration, main control circuit 1201 will have a quantity of RAM/SRAM 1503, a quantity of non-volatile memory 1504, and ROM for storing an operating system and boot sequence. ROM 1506 operates in a conventional manner and will not be described in greater detail hereinafter. Non-volatile memory 1504 is an addressable, preferably random access memory used to store information that is desirably saved even if power is removed from main control circuit 1201. For example, microprocessor 1501 may calculate statistics regarding the type of games played, the rate of game play, the rate of number request, or information about the player from player interface unit 1202. The statistics are preferably stored in a non-volatile memory 1504 to maintain integrity of the information. Similarly, non-volatile memory 1504 may be used to maintain the state of a game in progress on player interface unit 1202 so that is power is removed, universal gaming engine 1200 can restore player interface unit 1202 to the state at which it existed prior to the power outage. This may be important in a casino operation where the casino could incur liability for stopping a game when the player believes a payoff is imminent.

RAM 1503 serves as operating memory for temporary storage of rules access from rules library 1208 or for storing the operating system for quick access. RAM 1503 may also store groups of random numbers while they are being processed by the transform function algorithms as well as address data provided to and accepted from the public interface registry.

It should be understood that main control circuit 1201 may be implemented in a variety of fashions using conventional circuitry. While some memory will almost surely be required, the memory may be implemented as RAM, SRAM, EPROM or EEPROM to meet the needs of a particular application. Similarly, the components of main control circuit 1201 shown in FIG. 15 may be implemented as a single circuit or single integrated circuit or in multiple circuits or integrated circuits. Additional features may be added to implement additional functions in a conventional manner.

Rules Library

Figure 16:
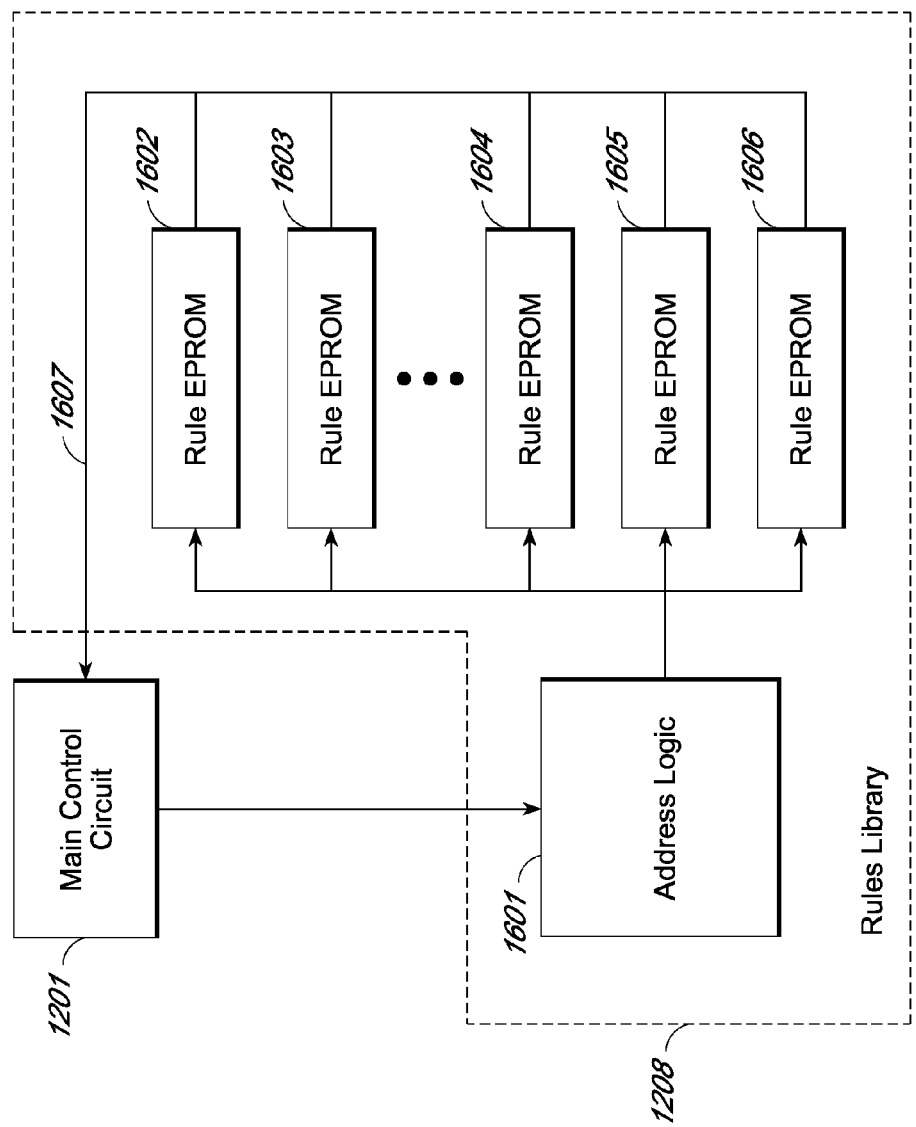
FIG. 16 illustrates in block diagram form implementation of the rules library in accordance with the present invention.

In exemplary embodiment of rules library 1208 is illustrated in block diagram form in FIG. 16. Rules library 1208 is preferably implemented as a plurality of volumes of rules where each volume is fixed in a rule EPROM 1602-1606. Any number of rule EPROM's can be supplied in rule library 1208. Also, rule EPROM's 1602 can be of various sizes. Rule EPROM's 1602-1606 may be replaced with equivalent memory circuits such as RAM, SRAM, or ROM. It is desirable from a gaming regulatory authority standpoint that rule EPROM's 1602-1606 cannot be altered once programmed so that the rules cannot be changed from the designed rules. This allows the gaining regulatory authority to verify the EPROM rules.

Address logic 1601 provides address signals to select one of rule EPROM's 1602-1606. Additionally, address logic 1601 serves to position a pointer to a specific rule within each rule EPROM 1602-1606. As set out herein before, which of rule EPROM's 1602-1606 is selected as determined by the current game being played as indicated by player interface unit 1202 (shown in FIG. 12). The location of the pointer within a rule EPROM is addressed based upon the current state of the game and the particular user initiated event indicated by player interface unit 1202. The information is conveyed from the user interface unit 1202 in a player record that is mapped to rule library 1208 by the information in public interface registry 1207.

In practice, a game developer will program a series of rules that dictate the progression of a game in response to user or player initiated events. The rules will also dictate when random numbers are accessed and the type of random numbers which should be accessed (i.e., uniform or non-uniform distributions). Rules will also control payoffs, and place boundaries on the types of player events which will be accepted. The game developer will then burn these rules, once complete, into a rule EPROM, such as rule EPROM's 1602-1606. The rule EPROM can then be verified by a gaming regulatory authority, and once approved, be distributed to owners of gaming engines wishing to implement the newly developed game. In order to install the new game, the rule EPROM is installed in rules library 1208 and registered in public interface registry 1207. The registration process described hereinbefore provides gaming engine 1200 the address information necessary to enable address logic 1601 to access a particular rule in rules library 1208 and provide that rule on output line 1607 to main control circuit 1201.

Although rules library 1208 has been described in terms of a plurality of EPROM's 1602-1606 wherein each EPROM holds one volume of rules pertaining to a particular game, it should be apparent that many other configurations for rules library 1208 are possible. Rules can be implemented in a single large memory or in a serial memory such as a tape or disk. Address logic 1600 may be integrated in rules library 1208, or may be integrated with main control circuit 1201. Each game may be implemented in a single EPROM or may require several EPROM's depending on the particular needs of an application.

Method of Operation

Figure 17:
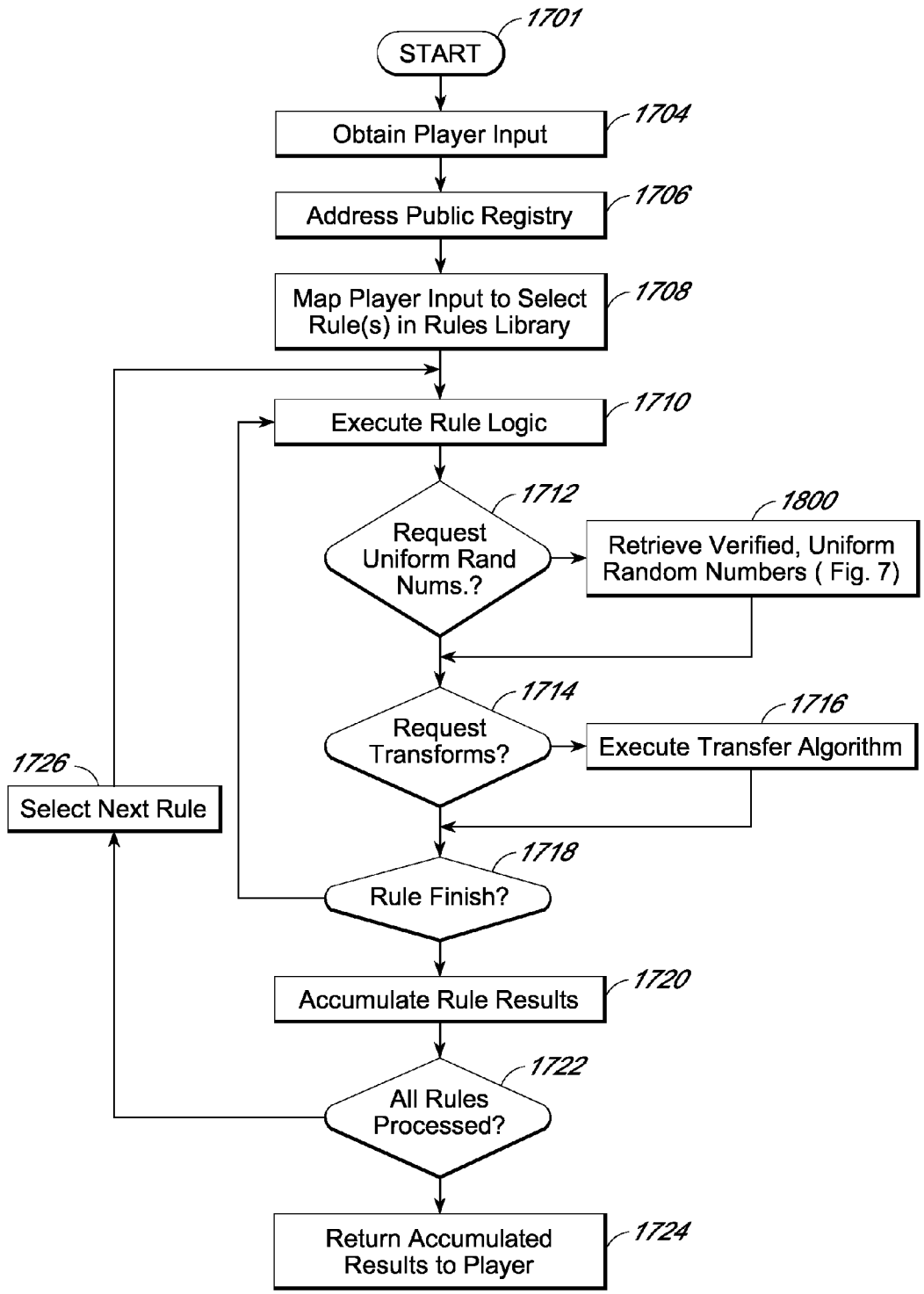
FIG. 17 illustrates a flow chart of a game implementation using the apparatus shown in FIG. 12.
Figure 18:
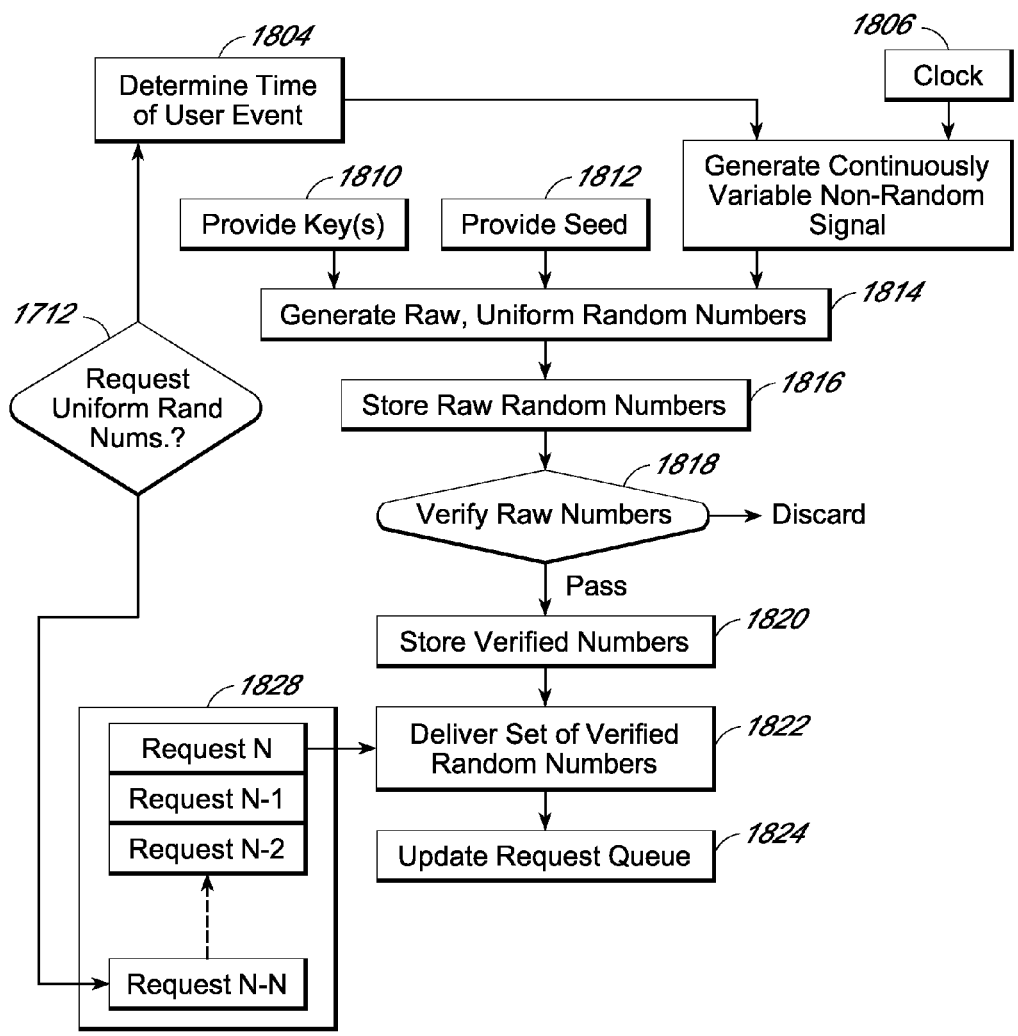
FIG. 18 illustrates a flow diagram for a second embodiment pseudo-random number distribution system.

FIG. 17 and FIG. 18 together illustrate in flow chart form a preferred method of operation of gaming engine 1200 in accordance with the present invention. FIG. 17 details operation of a first embodiment single player gaming engine 1200. When gaming engine 1200 is started as indicated at 1701 in FIG. 17, main control circuit 1201 is initialized and goes through a boot-up sequence to bring it to an initial state. In this initial state it waits for user input at step 1704. The player input or player record preferably indicates the game that is being played, the state of that game, and user initiated events and data that must be processed. Upon receipt of the player record, the public registry is addressed in step 1706. The public registry returns a mapping record that matches the user record with a particular rule in the rules library in step 1708.

One or more rules are accessed in step 1708. Each of the one or more rules are processed in serial fashion in the embodiment illustrated in FIG. 17. One rule is processed in each pass through steps 1710-1722. A logical component of a first rule is processed in step 1710, where the logical component includes processes of memory manipulations, calculations, and the like. In step 1712, it is determined if the particular rule that was executed in step 1710 requires pseudo-random numbers to process. If pseudo-random numbers are required, they are retrieved in step 1800 which is illustrated in greater detail in reference to FIG. 18.

It is determined if the rule requires any transform algorithm in step 1714. If a transform algorithm is required it is obtained in step 1716. It should be understood that the transform algorithm may be permanently resident in the main control circuit 1201 and so the step of obtaining 1716 may be trivial. Once the necessary transfer algorithm is obtained, it is determined if the rule is completely processed in step 1718. If not, flow returns to step 1710 and the rule logic is executed until the rule is completely processed and a final result of the rule is determined. Once the rule is finished, control moves from step 1718 to result accumulation step 1720.

Each rule accessed in step 1708 is processed in a similar manner by sequentially selecting each rule in step 1726 until it is determined that all rules have been processed in step 1722. Once all the rules are processed, the accumulated results are returned to the player in step 1724. The results are of the rule are determined in steps 1710, 1712, and 1714 by performing any transforms required on the random numbers, executing any deterministic components using conventional calculations and memory transactions.

Method for Random Number Generation

FIG. 18 illustrates a flow chart showing steps in filling random number request step 1800 in FIG. 17. The process shown in FIG. 18 is initiated when request 1714 is made. More accurately, many of the sub-processes shown in FIG. 18 are ongoing, but the processes for generating and supplying random numbers are also responsive to the request for random numbers 1800.

Continuously ongoing processes include clock generation step 1806, providing key value(s) step 1810, and providing seed value(s) step 1812. The clock signal generated in step 1806 need not be a real time clock, nor does it have to provide a linearly increasing or decreasing output. It is sufficient that clock 1806 output a continuously variable signal at a regular interval. As set out herein before, clock generation is preferably performed by random number control circuit 1304 shown in FIG. 13.

In a preferred embodiment, a signal is generated by the occurrence of the player event. For example, the time of the player event is determined at step 1804 and may be used as shown in FIG. 18. At step 1808, the clock signal and the player event signal are combined to provide a continuously variable non-random signal, Where both the player event signal and the clock are digital, the combination can be realized as logical function such as AND, OR, XOR, NAND, or the like. Also, the combination may be a concatenation or subtraction function. This feature of the present invention is optional, but adds a new degree of randomness.

At step 1814, a series of raw random numbers is generated using the continuously provided key values, seed values, and variable signal. The raw random numbers are stored at step 1816 to build a group large enough to be verified during step 1818. Groups of raw random numbers that fail verification step 1818 are discarded, while those that pass are stored at step 1820 in buffer 1303 shown in FIG. 13.

In accordance with a first embodiment, the verified random numbers are delivered in step 1822, returning process flow to step 1718 shown in FIG. 17. In an alternative embodiment shown in FIG. 18, request 1714 is queued at step 1828 using RAM 1503 shown in FIG. 15. Request queuing 1828 is implemented as a first in first out or "push up" register having N queue capacity. In one embodiment, N is between 2 and 10. Queuing step 1828 stores each request and processes each request in turn. In this embodiment, delivery step 1822 serves whatever request is provided during step 1828. Once a request is delivered, the request queue is updated in step 1824.

Although the request queue is optional, it increases efficiency of random number generation step 1800. This is especially important in the networked multi-user embodiment shown in FIG. 19. FIG. 20 illustrates generally a relationship between server speed, queue size, and the average number of customers, or requests for pseudo-random numbers, are waiting in the system. FIG. 20 is derived by modeling gaming engine 1900 (shown in FIG. 19) as an M/M/1 queue to produce parameters for expected wait times in the system. FIG. 20 assumes that requests for pseudo-random numbers are made according to a Poisson process. This means that the times between successive arrivals are independent exponential random variables.

Upon arrival, a customer either immediately goes into service if the server is free, or joins queue 1828 if the server is busy. When step 1822 finishes obtaining the requested subset, the request is returned to the game and leaves the system. The next request, if any, is serviced. The times required to form the requested random subsets are assumed to be independent exponential random variables also. With these assumptions, request queue 1828 can be viewed as an M/M/1 queue. The first two M's indicate that both the interarrival times as well as the service times for requests are exponential random variables. The "1" indicates there is just one server.

Server speed is largely determined by the hardware chosen to implement the present invention, and can be easily varied by those of skill in the art to meet the needs of a particular application. As is apparent in FIG. 20, higher server speeds result in fewer waiting customers. From the lower portion of FIG. 20, is apparent that if the queue size is reduced to zero (i.e., no request queue), the average wait time climbs even with very fast servers. Hence, to minimize wait time, a request queue is desirable.

It should be understood that the process steps shown in FIG. 18 may be carried out in any convenient-order unless expressly specified above. Process steps may be carried out in serial or parallel depending on the particular capabilities of main control circuit 1201 shown in FIG. 12. For example, where control circuit 1201 is multi-tasking or capable of parallel processing, several process steps may be executed at once. Also, process steps may be added to those shown in FIG. 18 to implement additional functions without departing from the inventive features of the present invention.

Network Embodiment

Figure 19:
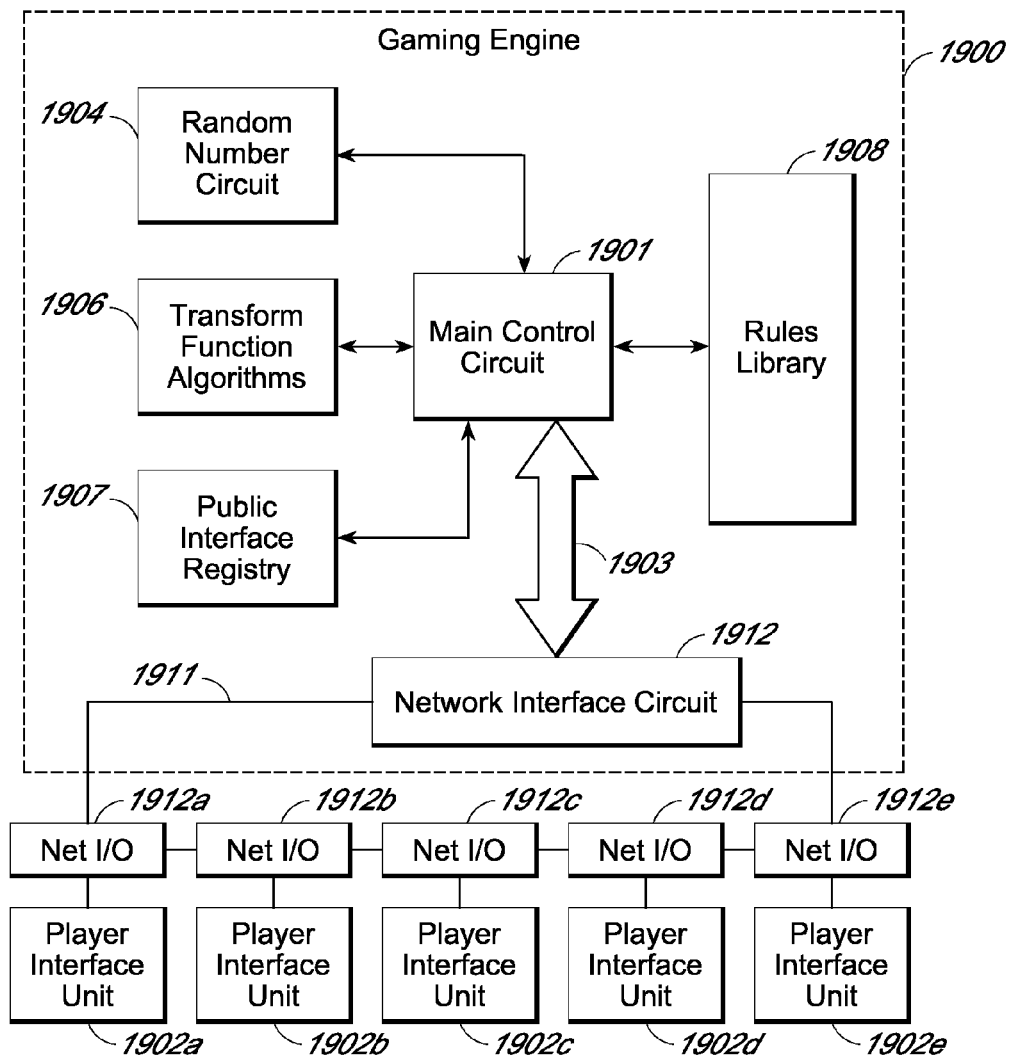
FIG. 19 illustrates a multiple player networked implementation in accordance with the present invention.
Figure 20:
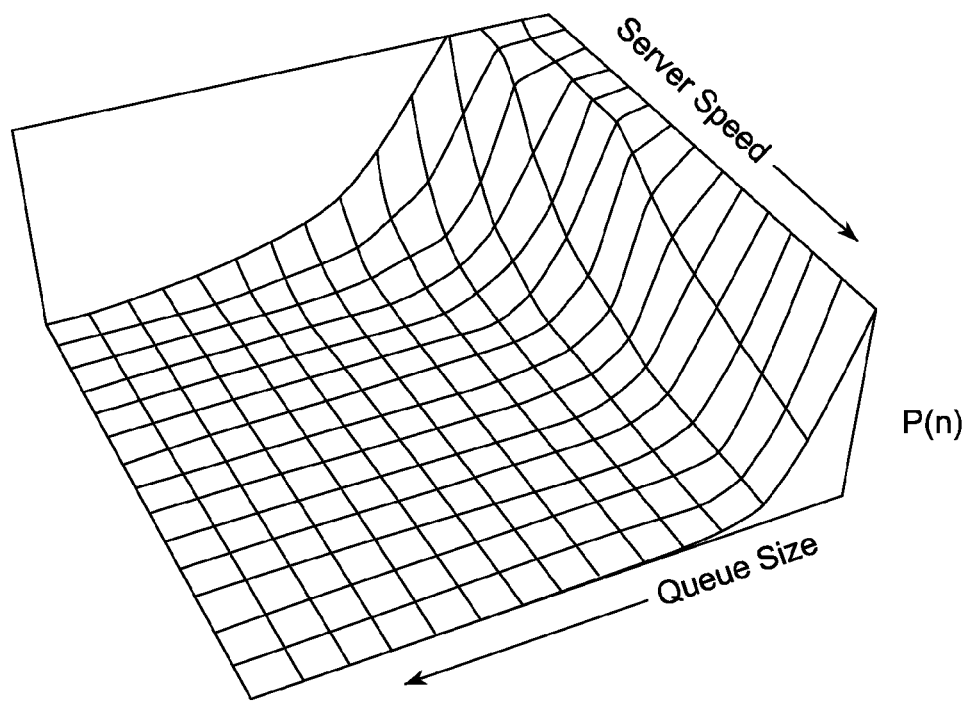
FIG. 20 illustrates in graphical form relationships between server speed, queue size, and customer wait times of an apparatus in accordance with the present invention.

FIG. 19 illustrates in block diagram for network embodiment in accordance with the present invention. Basic components of gaming engine 1900 are similar to gaming engine 1200 including random number circuit 1904, transform algorithms 1906, public interface registry 1907, and rules library 1908. Main control circuit 1901 includes all of the functions described herein before in reference to main control circuit 1201 but also includes function for supporting network interface circuit 1912. Data bus 1912 couples main control circuit 1901 to network interface circuit 1912.

The network embodiment shown in FIG. 19 serves a plurality of player interface units 1902a-1901e. This additional functionality is provided in part by network interface circuit 1912 and network I/O circuits 1912a-1912e. Network interface circuit 1912 and network I/O circuits 1912a-1912e can be conventional network circuits used for 10baseT, ethernet, Appletalk, or other known computer network systems. In selecting the network circuits, it is important that the data throughput is adequate to meet the needs of a particular system.

Network interface circuit 1912 communicates a plurality of player records of information to main control circuit 1901. Main control circuit may be a conventional processing circuit that serially processes each of the player records in a manner similar to main control circuit 1201. Preferably, main control circuit 1901 includes multitasking or parallel processing capabilities allowing it to process the plurality of player records simultaneously.

Simultaneous processing requires that main control circuit 1901 access a plurality of rules from rules library 1908, each of which may require main control unit 1901 to request a set of pseudo-random numbers from random number circuit 1904. In a preferred embodiment, the multiple requests for pseudo-random numbers are stored in a request queue implemented in memory of main control circuit 1901. The request queue is preferably able to store more than one request. A suitable request queue can store ten requests. Random number circuit 1904 treats each request from the request queue of main control circuit 1901 in a manner similar to the requests from main control circuit 1201 described herein before. The combination of the request queue with the buffer of random number circuit 1904 allows gaming engine 1900 to service requests corresponding to player initiated events very efficiently. A request queue holding even two or three requests can reduce the probability of any player waiting for delivery of a set of pseudo-random numbers significantly.

The request queue can be implemented by configuring a portion of the RAM available to main control circuit 1901 as a first-in first-out register or push up stack. Each request for a set of random numbers is initially placed at the bottom of the request queue and sequentially raised in the request queue until the request is filled. This operation is described herein before with respect to FIG. 18.

By now it should be appreciated that an apparatus, method, and system for gaming is provided with greatly improved efficiency and quality over existing gaming methods and systems. The universal gaming engine in accordance with the present invention is a gaming apparatus providing a consistent game development platform satisfying the needs of gaming authorities, house, player, and game developer. The gaming engine in accordance with the present invention separates the problems of developing game rules from the difficulty of producing chance events to support those rules. By including basic functions shared by a number of games, hardware costs are greatly reduced as new games can be implemented merely by providing a new set of rules in the rules library and the basic hardware operating the game remains unchanged. It is to be expressly understood that the claimed invention is not to be limited to the description of the preferred embodiments but encompasses other modifications and alterations within the scope and spirit of the inventive concept.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method for selecting games on a gaming machine, the method comprising:
   installing a plurality of game software on a gaming machine;
   choosing a set of game software to offer to users of the gaming machine;
   activating the set of game software;
   monitoring game activity of the users of the gaming machine;
   modifying the set of game software; and
   activating the modified set of game software.

2. The method of claim 1, wherein the plurality of game software is stored in a memory module.

3. The method of claim 2, wherein the installing comprises replacing the memory module with a new memory module.

4. The method of claim 2, wherein the installing comprises adding a new memory module.

5. The method of claim 2, wherein the installing comprises modifying data stored on the memory module.

6. The method of claim 1, wherein the installing comprises downloading the game software onto the gaming machine.

7. The method of claim 1, wherein the activating comprises receiving a verification from a third party.

8. The method of claim 1, wherein choosing a set of game software to offer to users of the gaming machine is based, at least in part, on the geographic location of the gaming machine.

9. A gaming system comprising:
   a memory module;
   a input device; and
   a processor configured to install a plurality of gaming software on a gaming machine, activate a set of gaming software, monitor the set of gaming software, and activate a modified set of gaming software.

10. The system of claim 9, wherein the set of game software is stored in the memory module.

11. The system of claim 10, wherein the memory module is replaceable with a new memory module.

12. The system of claim 10, further comprising a new memory module.

13. The system of claim 10, wherein data stored on the memory module can be modified.

14. The system of claim 9, wherein the input device is configured to download game software onto the gaming machine.

15. The system of claim 9, wherein a third party activates the game software.

16. The system of claim 9, wherein the processor is configured to install a set of gaming software based, at least in part, on the geographic location of the gaming machine.

17. A gaming system comprising:
   means for storing data;
   means for accepting input; and
   means for installing a plurality of gaming software on a gaming machine;
   means for activating a set of gaming software;
   means for monitoring the set of gaming software; and
   means for activating a modified set of gaming software.

18. The system of claim 17, wherein the set of game software is stored in the means for storing data.

19. The system of claim 18, wherein the means for storing data is replaceable.

20. The system of claim 18, further comprising new means for storing data.

21. The system of claim 18, wherein the data stored on the means for storing data is modifiable.

22. The system of claim 17, wherein the means for accepting input is configured to download game software onto the gaming machine.

23. The system of claim 17, wherein a third party activates the game software.

24. The system of claim 17, wherein the means for installing a set of gaming software is configured to install the gaming software based, at least in part, on the geographic location of the gaming machine.

* * * * *